(12) United States Patent
Soltani et al.

(10) Patent No.: US 12,451,915 B2
(45) Date of Patent: Oct. 21, 2025

(54) NONLINEAR POWER AMPLIFIER OPERATING MODE INDICATION

(71) Applicant: QUALCOMM Incorporated, San Diego, CA (US)

(72) Inventors: Morteza Soltani, San Diego, CA (US); Jing Sun, San Diego, CA (US); Xiaoxia Zhang, San Diego, CA (US); Iyab Issam Sakhnini, San Diego, CA (US); Raviteja Patchava, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 18/324,393

(22) Filed: May 26, 2023

(65) Prior Publication Data
US 2024/0396580 A1    Nov. 28, 2024

(51) Int. Cl.
*H04B 1/04*     (2006.01)
*H03F 3/21*     (2006.01)

(52) U.S. Cl.
CPC ............ *H04B 1/0483* (2013.01); *H03F 3/21* (2013.01); *H04B 2001/0408* (2013.01)

(58) Field of Classification Search
CPC ............ H04B 1/04; H04B 2001/0408; H04B 2001/0416; H04B 2001/0425;
(Continued)

(56) References Cited

U.S. PATENT DOCUMENTS

| 8,000,409 B2 * | 8/2011 | Chan ................... H04W 52/343 375/297 |
| 8,514,019 B2 * | 8/2013 | Okazaki ................. H03F 3/24 330/149 |

(Continued)

FOREIGN PATENT DOCUMENTS

WO    WO-2022073615 A1    4/2022

OTHER PUBLICATIONS

International Search Report and Written Opinion—PCT/US2024/029512—ISA/EPO—Sep. 12, 2024 (2301190WO).

*Primary Examiner* — Quochien B Vuong
(74) *Attorney, Agent, or Firm* — QUALCOMM Incorporated

(57) ABSTRACT

Methods, systems, and devices for wireless communication are described. A transmitting device may determine a power amplifier operating mode associated with non-linear distortion of an input waveform for a power amplifier, where the power amplifier operating mode may be from a set of two or more power amplifier operating modes each associated with respective amounts of the non-linear distortion. The transmitting device may transmit a set of reference signals associated with estimation of a wireless channel for a transmission, and the transmitting device may further transmit an additional set of reference signals associated with non-linear distortion mitigation for the transmission. In some examples, a resource density of the additional set of reference signals may be based on the power amplifier operating mode. In some examples, the transmitting device may transmit an indication of the power amplifier operating mode, the resource density, or both, to a receiving device.

30 Claims, 13 Drawing Sheets

(58) Field of Classification Search
CPC .... H04B 2001/0433; H04B 2001/0441; H04B 2001/045; H04B 1/0475; H04B 1/0483; H03F 3/20; H03F 3/21
See application file for complete search history.

(56) References Cited

U.S. PATENT DOCUMENTS

| | | | |
|---|---|---|---|
| 8,774,258 B2* | 7/2014 | Tadano | H04B 1/0475 330/149 |
| 9,077,409 B2* | 7/2015 | Lozhkin | H04B 1/0475 |
| 9,160,277 B2* | 10/2015 | Wang | H03F 3/211 |
| 9,859,946 B2 | 1/2018 | Morrison et al. | |
| 2014/0077875 A1 | 3/2014 | Wang et al. | |
| 2014/0327481 A1 | 11/2014 | Kim et al. | |
| 2023/0016303 A1 | 1/2023 | Kutz et al. | |

* cited by examiner

NONLINEAR POWER AMPLIFIER OPERATING MODE INDICATION

FIELD OF TECHNOLOGY

The following relates to wireless communication, including nonlinear power amplifier operating mode indications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support nonlinear power amplifier operating mode indications. For example, the described techniques provide for a transmitting device to determine a power amplifier operating mode associated with non-linear distortion of an input waveform for a power amplifier of the transmitting device. In some cases, the power amplifier operating mode may be selected from a set of two or more power amplifier operating modes that are each associated with respective amounts or ranges of the non-linear distortion. The transmitting device may transmit a set of reference signals associated with an estimation of a wireless channel for a transmission, and the transmitting device may transmit an additional set of reference signals associated with non-linear distortion mitigation for the transmission. In some aspects, a resource density of the additional set of reference signals is based on the power amplifier operating mode. In some examples, the transmitting device may transmit an indication of the power amplifier operating mode, the resource density, or both, to a receiving device.

A method for wireless communication is described. The method may include determining a power amplifier operating mode associated with non-linear distortion of an input waveform for a power amplifier, where the power amplifier operating mode is from a set of two or more power amplifier operating modes each associated with respective amounts of the non-linear distortion, transmitting a set of reference signals associated with estimation of a wireless channel for a transmission, and transmitting an additional set of reference signals associated with non-linear distortion mitigation for the transmission, where a resource density of the additional set of reference signals is based on the power amplifier operating mode.

An apparatus for wireless communication is described. The apparatus may include a processor, memory coupled with the processor, and instructions stored in the memory. The instructions may be executable by the processor to cause the apparatus to determine a power amplifier operating mode associated with non-linear distortion of an input waveform for a power amplifier, where the power amplifier operating mode is from a set of two or more power amplifier operating modes each associated with respective amounts of the non-linear distortion, transmit a set of reference signals associated with estimation of a wireless channel for a transmission, and transmit an additional set of reference signals associated with non-linear distortion mitigation for the transmission, where a resource density of the additional set of reference signals is based on the power amplifier operating mode.

Another apparatus for wireless communication is described. The apparatus may include means for determining a power amplifier operating mode associated with non-linear distortion of an input waveform for a power amplifier, where the power amplifier operating mode is from a set of two or more power amplifier operating modes each associated with respective amounts of the non-linear distortion, means for transmitting a set of reference signals associated with estimation of a wireless channel for a transmission, and means for transmitting an additional set of reference signals associated with non-linear distortion mitigation for the transmission, where a resource density of the additional set of reference signals is based on the power amplifier operating mode.

A non-transitory computer-readable medium storing code for wireless communication is described. The code may include instructions executable by a processor to determine a power amplifier operating mode associated with non-linear distortion of an input waveform for a power amplifier, where the power amplifier operating mode is from a set of two or more power amplifier operating modes each associated with respective amounts of the non-linear distortion, transmit a set of reference signals associated with estimation of a wireless channel for a transmission, and transmit an additional set of reference signals associated with non-linear distortion mitigation for the transmission, where a resource density of the additional set of reference signals is based on the power amplifier operating mode.

Some examples of the method, apparatuses, and non-transitory computer-readable medium described herein may further include operations, features, means, or instructions for transmitting a first message indicating the power amplifier operating mode, where transmitting the additional set of reference signals may be based on transmitting the first message indicating the power amplifier operating mode.

Some examples of the method, apparatuses, and non-transitory computer-readable medium described herein may further include operations, features, means, or instructions for receiving a second message that indicates the resource density of the additional set of reference signals in response to transmitting the first message indicating the power amplifier operating mode, where transmitting the additional set of reference signals may be based on receiving the second message that indicates the resource density.

Some examples of the method, apparatuses, and non-transitory computer-readable medium described herein may further include operations, features, means, or instructions for transmitting, within the first message, an indication of the resource density of the additional set of reference signals based on determining the power amplifier operating mode.

Some examples of the method, apparatuses, and non-transitory computer-readable medium described herein may further include operations, features, means, or instructions for transmitting a capability message indicating a capability to support the set of two or more power amplifier operating modes, where transmitting the first message that indicates the power amplifier operating mode may be based on the capability.

In some examples of the method, apparatuses, and non-transitory computer-readable medium described herein, the power amplifier operating mode may be determined based on an average power of the input waveform being above a threshold value, and the resource density of the additional set of reference signals includes a first resource density.

In some examples of the method, apparatuses, and non-transitory computer-readable medium described herein, the power amplifier operating mode may be determined based on an average power of the input waveform being below a threshold value, and the resource density of the additional set of reference signals includes a second density.

In some examples of the method, apparatuses, and non-transitory computer-readable medium described herein, the power amplifier operating mode may be determined based on a PAPR of the input waveform, an MCS, an operating point associated with the power amplifier, a resource block allocation, a bandwidth associated with the transmission, or any combination thereof.

Some examples of the method, apparatuses, and non-transitory computer-readable medium described herein may further include operations, features, means, or instructions for multiplexing the transmission in a frequency domain for communication with a set of multiple receiving devices, where determining the power amplifier operating mode may be based on a composite time domain signal associated with the multiplexed transmission.

Some examples of the method, apparatuses, and non-transitory computer-readable medium described herein may further include operations, features, means, or instructions for multiplexing the additional set of reference signals in a time domain, a frequency domain, or both, based on the power amplifier operating mode.

Some examples of the method, apparatuses, and non-transitory computer-readable medium described herein may further include operations, features, means, or instructions for multiplexing the additional set of reference signals in a time domain, a frequency domain, or both, based on a neural network adjustment at a receiving device for the non-linear distortion mitigation.

Some examples of the method, apparatuses, and non-transitory computer-readable medium described herein may further include operations, features, means, or instructions for multiplexing the additional set of reference signals in a time domain, a frequency domain, or both, based on a guard period being adjacent to an occasion for transmitting a reference signal of the additional set of reference signals in the time domain.

Some examples of the method, apparatuses, and non-transitory computer-readable medium described herein may further include operations, features, means, or instructions for discarding a guard time associated with transmitting the additional set of reference signals based on a recurrent neural network adjustment being used at a receiving device for the non-linear distortion mitigation.

Some examples of the method, apparatuses, and non-transitory computer-readable medium described herein may further include operations, features, means, or instructions for receiving a third message including an indication of a non-linear distortion mitigation technique used at a receiving device, where the resource density may be based on the non-linear distortion mitigation technique.

A method for wireless communication at a receiving device is described. The method may include receiving, from a first device, a first message indicating a power amplifier operating mode associated with non-linear distortion of an input waveform for a power amplifier of the first device, where the power amplifier operating mode is from a set of two or more power amplifier operating modes each associated with respective amounts of the non-linear distortion, measuring a set of reference signals associated with estimation of a wireless channel for a transmission by the first device, and measuring an additional set of reference signals associated with non-linear distortion mitigation for the transmission, where a resource density of the additional set of reference signals is based on the power amplifier operating mode.

An apparatus for wireless communication at a receiving device is described. The apparatus may include a processor, memory coupled with the processor, and instructions stored in the memory. The instructions may be executable by the processor to cause the apparatus to receive, from a first device, a first message indicating a power amplifier operating mode associated with non-linear distortion of an input waveform for a power amplifier of the first device, where the power amplifier operating mode is from a set of two or more power amplifier operating modes each associated with respective amounts of the non-linear distortion, measure a set of reference signals associated with estimation of a wireless channel for a transmission by the first device, and measure an additional set of reference signals associated with non-linear distortion mitigation for the transmission, where a resource density of the additional set of reference signals is based on the power amplifier operating mode.

Another apparatus for wireless communication at a receiving device is described. The apparatus may include means for receiving, from a first device, a first message indicating a power amplifier operating mode associated with non-linear distortion of an input waveform for a power amplifier of the first device, where the power amplifier operating mode is from a set of two or more power amplifier operating modes each associated with respective amounts of the non-linear distortion, means for measuring a set of reference signals associated with estimation of a wireless channel for a transmission by the first device, and means for measuring an additional set of reference signals associated with non-linear distortion mitigation for the transmission, where a resource density of the additional set of reference signals is based on the power amplifier operating mode.

A non-transitory computer-readable medium storing code for wireless communication at a receiving device is described. The code may include instructions executable by a processor to receive, from a first device, a first message indicating a power amplifier operating mode associated with non-linear distortion of an input waveform for a power amplifier of the first device, where the power amplifier operating mode is from a set of two or more power amplifier operating modes each associated with respective amounts of the non-linear distortion, measure a set of reference signals associated with estimation of a wireless channel for a transmission by the first device, and measure an additional set of reference signals associated with non-linear distortion mitigation for the transmission, where a resource density of the additional set of reference signals is based on the power amplifier operating mode.

Some examples of the method, apparatuses, and non-transitory computer-readable medium described herein may further include operations, features, means, or instructions for receiving, within the first message, an indication of the resource density of the additional set of reference signals.

Some examples of the method, apparatuses, and non-transitory computer-readable medium described herein may further include operations, features, means, or instructions for transmitting, to the first device, a second message that indicates the resource density of the additional set of reference signals in response to receiving the first message indicating the power amplifier operating mode, where measuring the additional set of reference signals may be based on transmitting the second message that indicates the resource density.

Some examples of the method, apparatuses, and non-transitory computer-readable medium described herein may further include operations, features, means, or instructions for receiving a capability message indicating a capability of a transmitting device to support the set of two or more power amplifier operating modes, where the power amplifier operating mode may be based on the capability of the transmitting device.

In some examples of the method, apparatuses, and non-transitory computer-readable medium described herein, the power amplifier operating mode may be based on an average power of the input waveform being above a threshold value, and the resource density of the additional set of reference signals includes a first resource density.

In some examples of the method, apparatuses, and non-transitory computer-readable medium described herein, the power amplifier operating mode may be based on an average power of the input waveform being below a threshold value, and the resource density of the additional set of reference signals includes a second density.

In some examples of the method, apparatuses, and non-transitory computer-readable medium described herein, the power amplifier operating mode may be based on a PAPR of the input waveform, an MCS, an operating point associated with the power amplifier, a resource block allocation, a bandwidth associated with the transmission, or any combination thereof.

Some examples of the method, apparatuses, and non-transitory computer-readable medium described herein may further include operations, features, means, or instructions for receiving the transmission, where the transmission may be multiplexed in a frequency domain for communication with a set of multiple receiving devices and the power amplifier operating mode may be based on a composite time domain signal associated with the transmission.

In some examples of the method, apparatuses, and non-transitory computer-readable medium described herein, the additional set of reference signals may be multiplexed in a time domain, a frequency domain, or both, based on the power amplifier operating mode.

In some examples of the method, apparatuses, and non-transitory computer-readable medium described herein, the additional set of reference signals may be multiplexed in a time domain, a frequency domain, or both, based on a neural network adjustment being used at the receiving device for the non-linear distortion mitigation.

In some examples of the method, apparatuses, and non-transitory computer-readable medium described herein, the additional set of reference signals may be multiplexed in a time domain, a frequency domain, or both, based on a guard period being adjacent to an occasion for transmitting a reference signal of the additional set of reference signals in a time domain.

Some examples of the method, apparatuses, and non-transitory computer-readable medium described herein may further include operations, features, means, or instructions for transmitting a third message including an indication of a non-linear distortion mitigation technique used at the receiving device, where the resource density may be based on the non-linear distortion mitigation technique.

DETAILED DESCRIPTION

Figure 1:
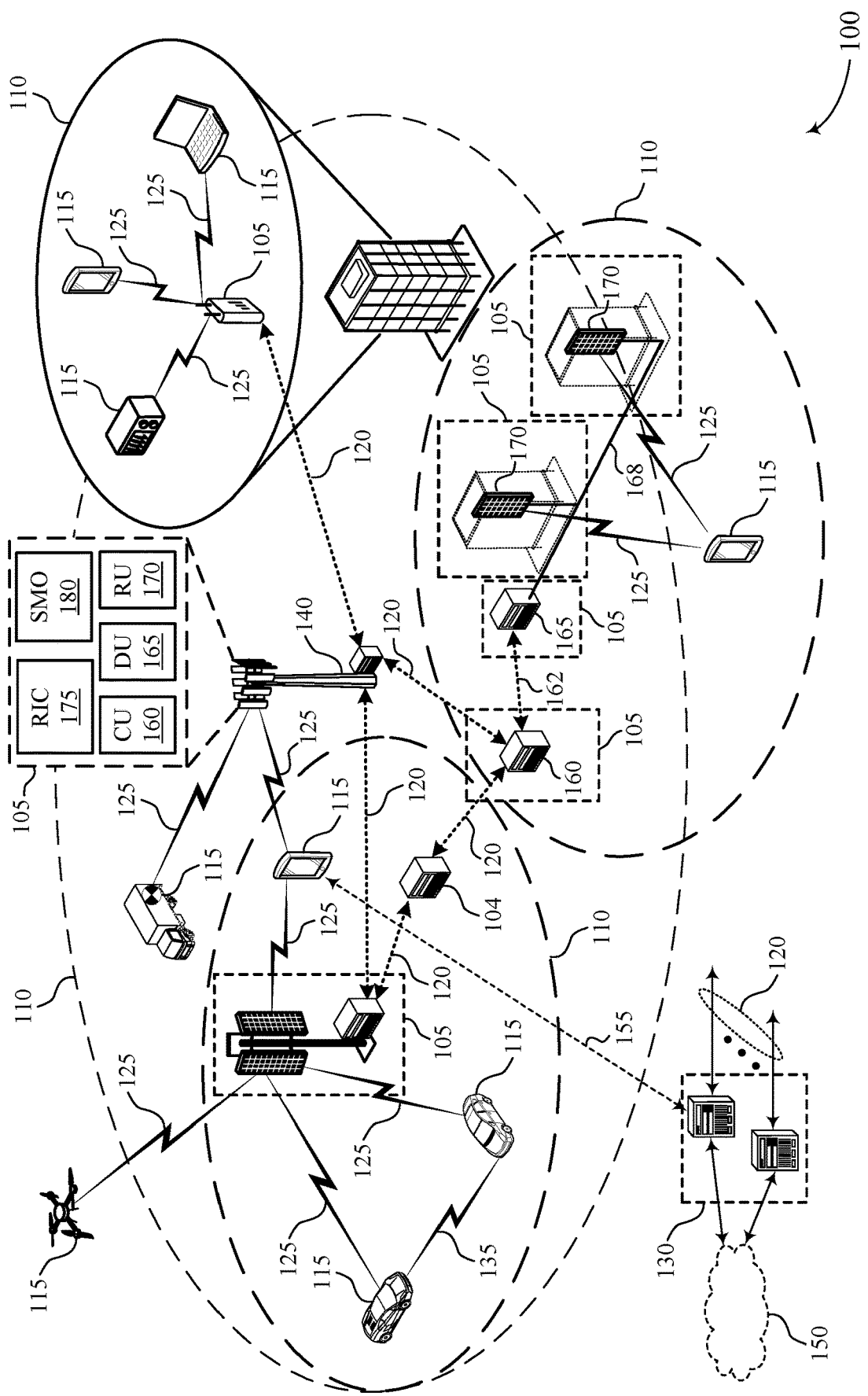
FIG. 1 shows an example of a wireless communications system that supports nonlinear power amplifier operating mode indications in accordance with one or more aspects of the present disclosure.

A receiving device may use reference signals to perform channel estimation for a transmission from a transmitting device. In some examples, one or more power amplifiers of the transmitting device may experience non-linear distortion that may affect transmitted reference signals, and the non-linear distortion may compromise the performance of channel estimation at the receiving device. To address this, an additional set of reference signals may be transmitted. For example, a set of low-peak-to-average power ratio (PAPR) reference signals may be transmitted for channel estimation (e.g., for a linear channel) at the receiving device, and an additional set of high-PAPR reference signals may be transmitted to enable non-linear distortion mitigation at the receiving device. The additional set of reference signals may be transmitted relatively less frequently, as non-linearity at the one or more power amplifiers of the transmitting device may not be changing very rapidly. However, in cases where an operation bandwidth, power amplifier power stage, or resource block allocation, or any combination thereof, change over time, non-linearity at the one or more power amplifiers may likewise change, and the additional set of reference signals may be transmitted for non-linear distortion mitigation at the receiving device. The additional set of reference signals may be associated with an increase in transmission overhead, however, and techniques for reducing such overhead may be desired, particularly in cases in which non-linearity changes relatively frequently.

In accordance with examples as described herein, a transmitting device may evaluate an extent of non-linear distortion at one or more power amplifiers of the transmitting device (e.g., based on an input waveform for the one or more power amplifiers). The transmitting device may configure an additional set of reference signals (e.g., high-PAPR reference signals), and a resource density (e.g., in a time domain, a frequency domain, or both) of the additional set of reference signals may be based on the extent of non-linear distortion, thereby allowing for a relatively reduced resource density of the additional set of reference signals in cases where relatively lower non-linearity is experienced by the transmitting device. In some examples, the transmitting device may determine a power amplifier operating mode from a set of at least two power amplifier operating modes based on the non-linear distortion extent and, in some cases, based on other conditions, and the resource density may be based on the power amplifier operating mode. The transmitting device may indicate, to the receiving device, the determined power amplifier operating mode, the resource density, or both. Accordingly, by adjusting the resource density based on the extent of non-linear distortion, overhead associated with the additional set of reference signals may be reduced. Further, the set of additional reference signals (e.g., one or more high-PAPR reference signals) may be flexibly and dynamically configured based on an amount of non-linearity experienced at a power amplifier of a transmitting device.

Aspects of the disclosure are initially described in the context of wireless communications systems. Aspects of the disclosure are additionally described in the context of operating mode diagrams and process flows. Aspects of the disclosure are further illustrated by and described with reference to apparatus diagrams, system diagrams, and flowcharts that relate to nonlinear power amplifier operating mode indication.

FIG. 1 shows an example of a wireless communications system 100 that supports nonlinear power amplifier operating mode indications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an N1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support nonlinear power amplifier operating mode indications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device (e.g., a network entity 105, a UE 115) or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115, a network entity 105) may perform reception operations in accordance with multiple receive configurations (e.g., directional listening) when receiving various signals from a receiving device (e.g., a UE 115, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In wireless communications system 100, a receiving device (e.g., a UE 115, a network entity 105, another device) may receive and utilize demodulation reference signals (DMRSs) to perform channel estimation for a transmission from a transmitting device (e.g., a UE 115, a network entity 105, another device). In some examples, one or more power amplifiers of the transmitting device may experience non-linear distortion that may affect transmitted DMRSs, and the non-linear distortion may compromise the performance of channel estimation at the receiving device (e.g., the non-linear distortion may degrade reception performance). To address this, different sets of reference signals may be transmitted. For example, a set of low-PAPR DMRSs may be transmitted for channel estimation (e.g., for a linear channel), and an additional set of high-PAPR reference signals may be transmitted to enable non-linear distortion mitigation at the receiving device. The additional set of reference signals may be transmitted relatively less frequently, as non-linearity at the one or more power amplifiers of the transmitting device may not change very rapidly. In cases where an operation bandwidth, power amplifier power stage, or resource block allocation, or any combination thereof, change over time, non-linearity at the one or more power amplifiers may likewise change, and the additional set of reference signals may be transmitted for non-linear distortion mitigation at the receiving device. In some cases, however, the additional set of reference signals may be associated with an increase in transmission overhead, and techniques for reducing the overhead in the wireless communications system 100 may be desired, particularly in cases in which non-linearity changes relatively frequently.

In accordance with examples as described herein, a transmitting device may evaluate an extent of non-linear distortion at one or more power amplifiers of the transmitting device (e.g., based on an input waveform for the one or more power amplifiers). The transmitting device may configure an additional set of reference signals (e.g., high-PAPR reference signals), and a resource density (e.g., in a time domain, a frequency domain, or both) of the additional set of reference signals may be based on the non-linear distortion extent, thereby allowing for reduced resource density in cases with lower non-linearity. In some examples, the transmitting device may determine a power amplifier operating mode from a set of at least two power amplifier operating modes based on the non-linear distortion extent and, in some cases, based on other conditions, and the resource density may be based on the power amplifier operating mode. The transmitting device may indicate the receiving device of the determined power amplifier operating mode, the resource density, or both. Accordingly, by adjusting the resource density based on the extent of non-linear distortion, overhead associated with the additional set of reference signals may be reduced.

Figure 2:
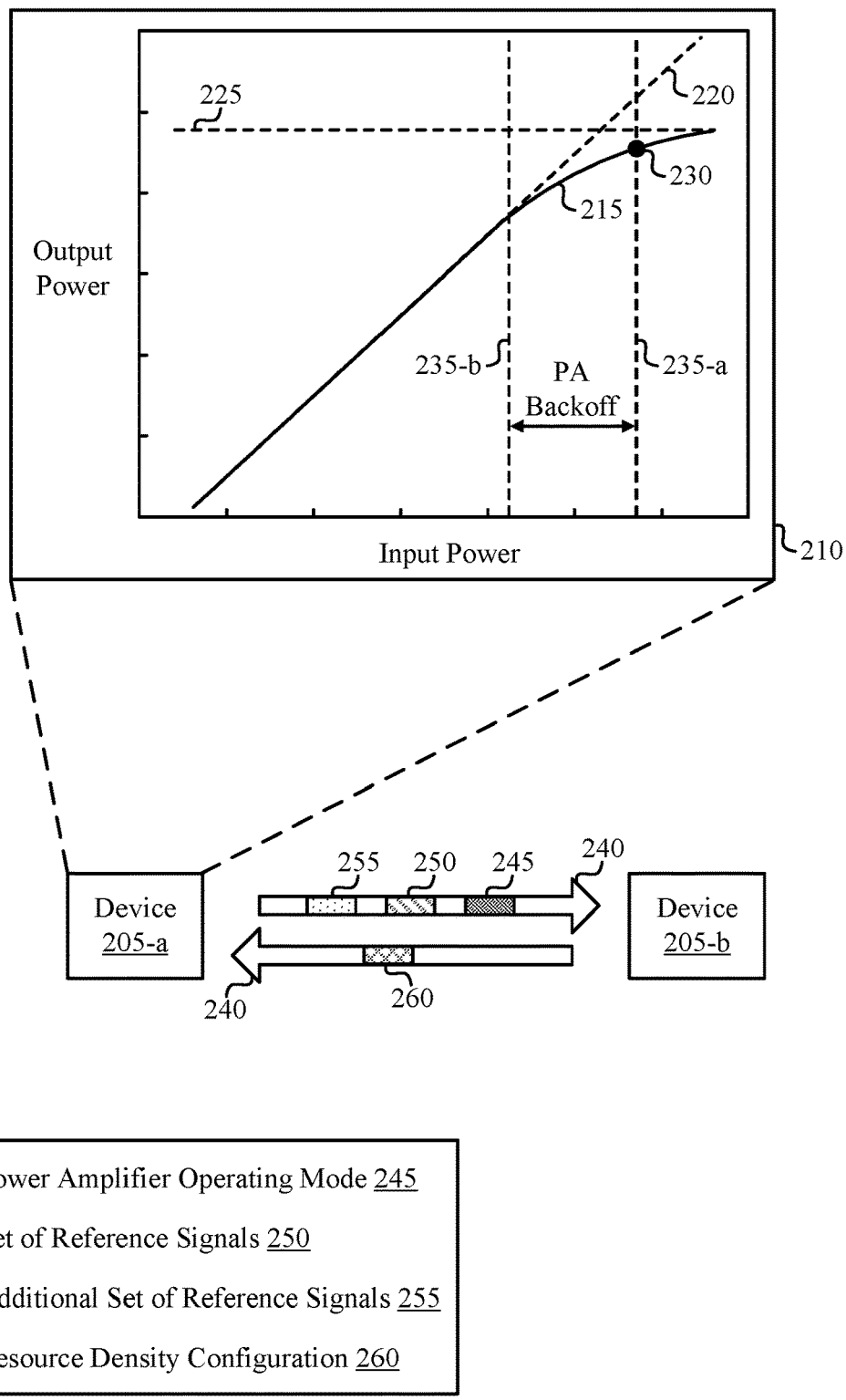
FIG. 2 shows an example of a wireless communications system that supports nonlinear power amplifier operating mode indications in accordance with one or more aspects of the present disclosure.

FIG. 2 shows an example of a wireless communications system 200 that supports nonlinear power amplifier operating mode indications in accordance with one or more aspects of the present disclosure. The wireless communications system 200 may include a device 205-a and a device 205-b, which may be examples of devices as described herein, such as a UE 115, a network entity 105, or another device. In some examples, the device 205-a may be an example of a transmitting device, and the device 205-b may be an example of a receiving device, as described herein. The device 205-a and the device 205-b may communicate via one or more communication links 240, which may be examples of communication links 125 as described with reference to FIG. 1.

In some examples, the device 205-a may be equipped with one or more power amplifiers to increase the power of signals associated with a transmission. This may increase signal quality and facilitate reception of transmissions at the device 205-b. The power graph 210 (e.g., an AM-AM graph) may illustrate output power values (e.g., in decibel milliwatts (dBm)) for a given input power value (e.g., in dBm) for the one or more power amplifiers of the device 205-a. In some examples, the one or more power amplifiers of the device 205-a may experience non-linear distortion at relatively higher input power values, as illustrated in the power graph 210. For instance, the curve 215, which may represent the actual output power values associated with input values of the one or more power amplifiers, may deviate from the curve 220, which may represent an ideal (e.g., linear) output power values. The non-linear distortion may lead to additional interference both in a frequency band of a transmitted signal (e.g., in-band distortion) and in adjacent frequency bands (e.g., out-of-band interference).

In some cases, the one or more power amplifiers may become saturated at a limit saturation value 225 (e.g., $P_{sat\_max}$), where an increase in input power may not be associated with a corresponding increase in output power. For example, the one or more power amplifier may have a limit saturation value 225 of 9 dBm, and output power of the one or more power amplifiers may not (e.g., or only slightly) increase above 9 dBm regardless of an input power of the one or more power amplifiers. In some examples, a saturation point 230 (e.g., $P_{sat\_3dB}$) may be defined, for example, at a point in the curve 215 that deviates some value (e.g., 3 dBm) from the curve 220. For example, at an input power value of −16.2 dBm, an output power value corresponding to the curve 215 may be 8.3 dBm, while an output power value corresponding to the curve 220 may be 11.3 dBm (e.g., $P_{ideal\_lin}$). As these output power values differ by 3 dBm, the saturation point 230 may be defined at the corresponding values in the curve 215 (e.g., an input power of −16.2 dBm and an output power of 8.3 dBm).

In some cases, transmissions by the device 205-a affected by non-linear distortion may interfere with frequency bands adjacent to an operating frequency band of the device 205-a, which may disrupt communications for communication systems operating in the adjacent frequency bands. For example, if the device 205-a experiences non-linear distortion at the one or more power amplifiers, a transmission in the operating frequency band may result in out-of-band interference to adjacent frequency bands. As such, a spectral mask (e.g., spectrum mask) may be adopted at the device 205-a which may define an amount of power that may be emitted by the device 205-a at a center frequency (e.g., the operating frequency) and at adjacent frequency bands (e.g., frequency points). For example, the spectral mask may define an out-of-band criteria (e.g., an adjacent channel leakage ratio (ACLR) limit), an in-band criteria (e.g., a total in-band transmitted power), and a power class (e.g., a transmit power class). In some cases, out-of-band criteria (e.g., ACLR limits) corresponding to a spectral mask for lower frequency bands (e.g., FR1, FR2, FR3) may be more stringent due to relatively more congested bands and wider beam utilization, while higher frequency bands (e.g., FR4 and beyond) may have relatively less stringent limits (e.g., ACLR requirements) (e.g., as beams in these frequency ranges may be relatively narrower).

The device 205-a may be configured to perform transmissions using OFDM techniques and single carrier (SC) techniques (e.g., SC-frequency division multiple access (SC-FDMA) techniques). Transmissions using OFDM-based waveforms may benefit from relatively higher spectral efficiency, which may be used in scenarios where energy efficiency limits are more relaxed. Transmissions of SC-based waveforms may be used in other scenarios that may have relatively more stringent energy efficiency limits, as a lower PAPR associated with SC-based waveforms may lead to higher power amplifier efficiency and extended battery life of the device 205-a. In some examples, to facilitate frequency domain equalization, a cyclic prefix (e.g., a guard interval (GI) or unique word (UW)) may be used with SC-based techniques to create blocks or symbols similar to those in OFDM-based techniques.

The device 205-a and the device 205-b may perform channel estimation for an upcoming transmission based on a set of one or more reference signals, such as DMRSs (e.g., DMRS sequences). In some examples, for uplink cases (e.g., from a UE 115 to a network entity 105) using DFT-s-OFDM techniques, a Zadoff-Chu sequence may be used for modulation and coding schemes (MCSs) except those with π/2-binary phase-shift keying (BPSK). Meanwhile π/2-BPSK DMRS may be used for MCSs with π/2-BPSK modulated data. For uplink or downlink cases using OFDM-based waveforms, a quadrature phase shift keying (QPSK) modulated Fold sequence may be used for any MCSs.

The device 205-a and the device 205-b may select a DMRS (e.g., a DMRS sequence) based on various factors, such as a PAPR value, autocorrelation and cross correlation properties, or other factors. In some examples, when non-linear distortion is present and an OFDM-based waveform is used, data and a corresponding DMRS may experience similar non-linear distortion and may have a similar PAPR profile. When non-linear distortion is present and an SC-based waveform is used, data and a corresponding DMRS may experience different non-linear distortion and data (e.g., with higher order modulation and high MCS levels) may have a different PAPR profile compared to the corresponding DMRS. In either case, when non-linear distortion is present at the one or more power amplifiers, linear channel estimation (e.g., of a wireless channel) may be compromised.

In some cases, the device 205-a may implement power amplifier backoff (e.g., PA backoff) procedures to reduce non-linear distortion, which may support compliance with a defined spectral mask. For example, the device 205-*a* may reduce input power by some amount and reduce an average input power from a first value 235-*a* to a second value 235-*b* (e.g., as illustrated in the power graph 210). This may cause a reduction in non-linear distortion at relatively higher input power values, as the one or more power amplifiers may operate closer to a linear region of the curve 215. In some cases, a relatively smaller power amplifier backoff level may be associated with increased output power relative to relatively higher power amplifier backoff levels, which may increase coverage (e.g., signal coverage) for the device 205-*a*, and may also lead to relatively higher efficiency and improved battery life for the device 205-*a*. However, the relatively smaller power amplifier backoff levels may be associated with increased signal distortion (e.g., non-linear distortion), which may decrease coverage for the device 205-*a*, and may also result in a violation of a spectral mask regulation defined at the device 205-*a*. As such, there may be a tradeoff between using relatively higher or lower levels of power amplifier backoff at the device 205-*a*.

In some examples, the device 205-*a* may be configured to transmit an additional set of one or more reference signals to enable non-linear distortion mitigation at the device 205-*b*. For example, a set of reference signals (e.g., low-PAPR DMRSs) may be transmitted (e.g., on a first symbol of a slot) by the device 205-*a* for channel estimation (e.g., linear channel estimation) by the device 205-*b*, and an additional set of reference signals (e.g., high-PAPR reference signals) may be transmitted (e.g., on a second symbol of a slot, prior to a high-PAPR data transmission) for non-linear distortion mitigation procedures. The additional set of reference signals may be transmitted less frequently, as non-linearity at the one or more power amplifiers may not change very rapidly if operation bandwidth, power amplifier power stage, or resource block allocations remain relatively fixed. However, in cases where operation bandwidth, power amplifier power stage, or resource block allocation change, non-linearity at the one or more power amplifiers may change and the additional set of reference signals may be transmitted by the device 205-*a* for non-linear distortion mitigation by the device 205-*b*. This may be associated with an increase in transmission overhead for the device 205-*a* and the device 205-*b*, and techniques for reducing the overhead associated with the additional set of high-PAPR reference signals, particularly in cases where non-linearity changes relatively frequently, may be desired.

In accordance with examples as described herein, the device 205-*a* may configure a resource density (e.g., in a frequency domain, a time domain, or both) for an additional set of reference signals 255 (e.g., high-PAPR reference signals) based on non-linear distortion experienced at the one or more power amplifiers of the device 205-*a*. For example, the device 205-*a* may evaluate an extent (e.g., level, amount) of non-linearity experienced at the one or more power amplifiers, which may be dependent on various factors that may be monitored or determined by the device 205-*a*, such as an input waveform for the one or more power amplifiers (e.g., an average PAPR value of the input waveform), an MCS level, a power amplifier operating region (e.g., within the power graph 210), a resource block allocation, a bandwidth, or any combination thereof. The device 205-*a* may then configure the resource density of the additional set of reference signals 255 based on the extent of non-linearity determined by the device 205-*a*.

In some examples, a set of two or more power amplifier operating modes may be defined for the device 205-*a* and the device 205-*b*. The set of two or more power amplifier operating modes may correspond to a level of non-linearity at the one or more power amplifiers. For example, there may be an operating mode corresponding to different amounts, magnitudes, and/or ranges of non-linear distortion. Such operating modes may, for example, be referred to as a fully linear operating mode, a moderately non-linear operating mode, a severely non-linear operating mode, or modes associated with other levels of non-linearity, to name a few examples. In some examples, the device 205-*a* may determine a power amplifier operating mode from the set of two or more power amplifier modes based on the extent of non-linearity experienced at the one or more power amplifiers. For example, the device 205-*a* may determine a power amplifier operating mode based on an operating region, which may be determined based on an average power (e.g., PAPR) value associated with an input waveform for the one or more power amplifiers (e.g., the second value 235-*b*). For example, the operating region may be determined based on the distance between the average power value and a saturation point (e.g., the saturation point 230). The power amplifier operating modes and corresponding operating regions are described in more detail herein, with reference to FIG. 3. In some examples, the device 205-*a* may transmit a message (e.g., via a communication link 240) indicating a determined power amplifier operating mode 245 to the device 205-*b* (e.g., via one or more messages).

The power amplifier operating mode 245 determined by the device 205-*a* may be associated with a resource density (e.g., a time domain density, a frequency domain density, or both) of the additional set of reference signals 255. For example, a relatively lower resource density may be used for the additional set of reference signals 255 when the power amplifier operating mode 245 corresponds to a relatively lower level of non-linearity, which may reduce transmission overhead at the device 205-*a* and the device 205-*b*. Alternatively, a relatively higher resource density may be used for the additional set of reference signals 255 when the power amplifier operating mode 245 corresponds to a relatively higher level of non-linearity, which may improve non-linear distortion mitigation or estimation at the device 205-*b*.

In some examples, the device 205-*b* may determine the resource density for the additional set of reference signals 255 (e.g., high-PAPR reference signals) based on receiving an indication of the power amplifier operating mode 245. Additionally, or alternatively, the resource density may be explicitly indicated. In some examples, such as when the device 205-*a* is a network entity 105 and the device 205-*b* is a UE 115, the device 205-*a* may indicate the power amplifier operating mode 245 and additionally indicate the resource density of the additional set of reference signals 255 in the message (e.g., or within another message) to the device 205-*b*. The indication of the power amplifier operating mode 245, the resource density, or both, may be a dynamic indication (e.g., a Layer 1 indication (e.g., via a downlink control information (DCI) message or other physical-layer signaling), or a Layer 2 indication (e.g., via a medium access control-control element (MAC-CE) message), or any combination thereof) or a static or semi-static indication (e.g., a Layer 3 indication (e.g., via an RRC message)). Additionally, or alternatively, such as when the device 205-*a* is a network entity 105 and the device 205-*b*, is a UE 115, the device 205-*b* may transmit a resource density configuration 260 in response to the indication of the power amplifier operating mode 245, which may indicate the resource density for the additional set of reference signals 255 to the device 205-*a*.

In some examples, the indication of the resource density (e.g., transmitted by the device 205-*a* or the device 205-*b*) may include one or more time domain resources, frequency domain resources, or both, for the device 205-*a* to use for transmission of the additional set of reference signals 255. In some cases, the device 205-*a* may transmit a scheduling request to the device 205-*b* requesting to be scheduled with the additional set of reference signals 255, and the device 205-*b* may transmit the resource density configuration 260 in response to the scheduling request. The indication of the power amplifier operating mode 245, the resource density configuration 260, or both, may be a dynamic indication (e.g., a Layer 1 indication via a DCI message or other physical-layer signaling, or a Layer 2 indication via a MAC-CE message, or any combination thereof) or a static indication (e.g., a Layer 3 indication via an RRC message).

The device 205-*a* may transmit a set of reference signals 250 (e.g., a set of DMRSs, such as low-PAPR DMRSs) and transmit the additional set of reference signals 255 (e.g., high-PAPR reference signals) based on the power amplifier operating mode 245 in accordance with the resource density and any indicated resources (e.g., time domain resources, frequency domain resources, or both). As such, the device 205-*b* may perform no-linear distortion mitigation procedures based on the additional set of reference signals 255, while transmission overhead may be reduced due to the flexibility in resource density.

In some examples, the device 205-*a* may transmit a capability message to the device 205-*b* to indicate that the device 205-*a* has a capability to process a power amplifier operating mode 245 indications and transmit the additional set of reference signals 255 based on the power amplifier operating mode 245. For example, such as in cases where the device 205-*a* is a UE 115 and the device 205-*b* is a network entity 105, the device 205-*a* may transmit the capability message via UE capability information signaling to the device 205-*b*, and the device 205-*a* may transmit a subsequent message indicating the power amplifier operating mode 245 based on transmitting the capability message. In other cases, such as when the device 205-*b* is a UE 115 and the device 205-*a* is a network entity 105, the device 205-*b* may instead transmit a capability message (e.g., via UE capability information signaling) to the device 205-*a* that indicates a capability of the device 205-*b* to process a power amplifier operating mode 245 indication and receive the additional set of reference signals 255 with a resource density based on the power amplifier operating mode 245. In these cases, the device 205-*a* may transmit a message indicating the power amplifier operating mode 245 (e.g., and a resource density, in some cases) based on receiving the capability message from the device 205-*b*.

In some examples, the device 205-*a* may perform multiplexing of reference signal samples corresponding to the additional set of reference signals 255. For example, the device 205-*a* may multiplex the additional set of reference signals 255 in other channels (e.g., in one or more physical downlink or uplink shared channels) in a time domain, a frequency domain, or both. In some cases, the device 205-*a* may perform multiplexing the additional set of reference signals 255 based on the power amplifier operating mode 245. For example, the device 205-*a* may refrain from multiplexing the additional set of reference signals 255 if the resource density of the additional set of reference signals 255 is relatively large, which may correspond to some power amplifier operating modes 245 (e.g., a moderately non-linear operating mode or a severely non-linear operating mode). Alternatively, the device 205-*a* may perform multiplexing in other channels for the additional set of reference signals 255 if the resource density of the additional set of reference signals 255 is small, which may correspond to some other power amplifier operating modes 245 (e.g., a linear operating mode).

In some examples, such as when the device 205-*a* is a network entity 105, the device 205-*a* may serve a plurality of users via FDM techniques. In these examples, a generated time domain waveform may have a relatively high-PAPR, and the composite time domain signal (e.g., to serve the plurality of users) may drive the one or more power amplifiers of the device 205-*a* into the non-linear region of the power graph 210. As such, the device 205-*a* may evaluate the generated time domain composite signal and determine whether the one or more power amplifiers would be operating in the non-linear region. For example, the device 205-*a* may determine a power amplifier operating mode 245 associated with the generated time domain composite signal, and may determine the quantity of users from the plurality of users that may be supported by the device 205-*a*. The quantity of users may be determined based on the power amplifier operating mode 245. For example, when operating on a power amplifier operating mode 245 corresponding to a moderate or high level of non-linearity, the device 205-*a* may support FDM for a subset of the plurality of users to reduce non-linearity, while when operating on a power amplifier operating mode 245 corresponding to a low level of non-linearity, the device 205-*a* may support multiplexing for all of the plurality of users. The device 205-*a* may indicate the power amplifier operating mode 245 to each of the supported users and may configure an additional set of reference signals 255 with a resource density based on the power amplifier operating mode 245 for reception by each of the supported users.

Accordingly, by implementing a set of two or more power amplifier operating modes and variable resource densities for the additional set of reference signals 255, the device 205-*a* may support non-linear distortion mitigation procedures at the device 205-*b* while reducing overhead associated with the additional set of reference signals 255, especially in cases where conditions affecting non-linearity change relatively frequently.

Figure 3:
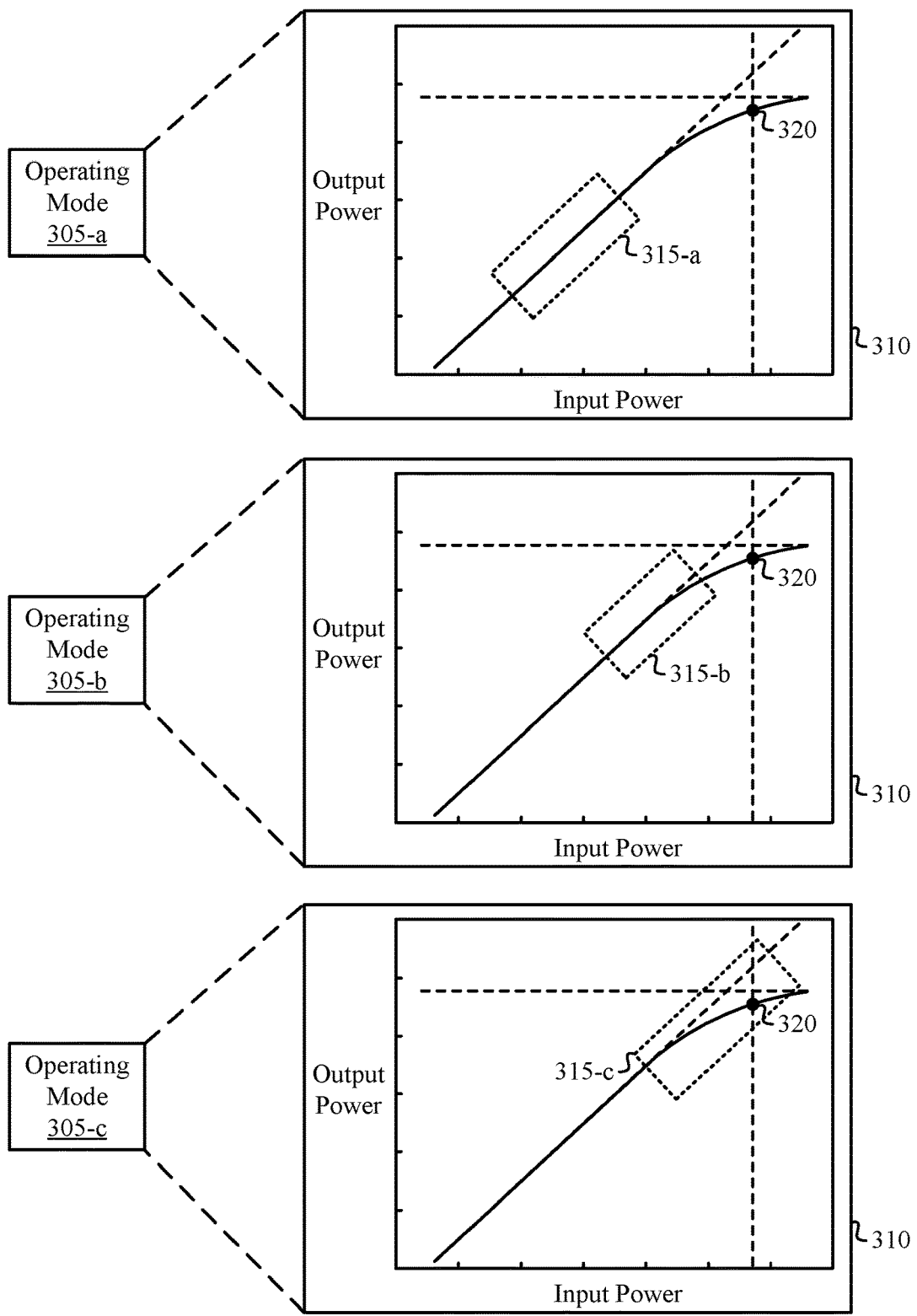
FIG. 3 shows an example of an operating mode diagram that supports nonlinear power amplifier operating mode indications in accordance with one or more aspects of the present disclosure.

FIG. 3 shows an example of an operating mode diagram 300 that supports nonlinear power amplifier operating mode indications in accordance with one or more aspects of the present disclosure. The operating mode diagram 300 may be implemented in the wireless communications system 100 or the wireless communications system 200. For example, the operating mode diagram 300 may illustrate a set of power amplifier operating modes including an operating mode 305-*a*, an operating mode 305-*b*, and an operating mode 305-*c*, which may be examples of power amplifier operating modes 245 as described herein, with reference to FIG. 2. Further, the operating modes 305 may be associated with a power graph 310, which may be an example of the power graph 210, as described herein with reference to FIG. 2.

In some examples, the operating mode 305-*a* may correspond to a linear operating mode 305-*a* (e.g., a linear power amplifier operating mode, a fully linear operating mode) and may be associated with an input waveform with an average power (e.g., PAPR) within a linear operating region 315-*a* that may be relatively far from a saturation point 320 of the power graph 310. Here, the operating mode 305-*a* may correspond to values of the input power and output power for an input waveform that are bounded within an operating region 315-*a* Similarly, the operating mode 305-*b* may correspond to a moderately non-linear operating mode 305-*b* and may be associated with an input waveform with an average power within a moderately non-linear operating region 315-b (e.g., with some minimum and maximum power values that define the moderately non-linear operating region 315-b) that may be relatively closer to the saturation point 320. Further, the operating mode 305-c may correspond to a severely non-linear operating mode 305-c and may be associated with an input waveform with an average power within a severely non-linear operating region 315-c (e.g., with some minimum and maximum power values that define the severely non-linear operating region 315-c) that may be close to, at, or beyond the saturation point 320.

In some examples, the operating mode 305-a, the operating mode 305-b, and the operating mode 305-c may be implemented at a transmitting device (e.g., a device that is to transmit one or more sets of reference signals, such as device 205-a described with reference to FIG. 2), a receiving device (e.g., a device that is to receive the one or more sets of reference signals, such as device 205-b described with reference to FIG. 2), or both. While the operating mode diagram 300 illustrates three operating modes 305, a device (e.g., the transmitting device or the receiving device) may implement two operating modes 305 (e.g., a linear operating mode and a non-linear operating mode) or a different quantity of operating modes 305 (e.g., associated with a relatively larger quantity of operating regions 315). That is, any quantity of operating modes may be defined, and the examples described herein should not be considered limiting to the scope of the claims or the disclosure.

The transmitting device may determine (e.g., select) a power amplifier operating mode based on an average power value (e.g., a PAPR value) of an input waveform for a power amplifier associated with an upcoming transmission by the transmitting device, as described herein with reference to FIG. 2. For example, the transmitting device may select the operating mode 305-a if the transmitting device determines that the average power is relatively far from the saturation point 320 and the average power is not associated with non-linear distortion at the power amplifier (e.g., the average power is within the linear operating region 315-a). Alternatively, the transmitting device may select the operating mode 305-c if the transmitting device determines that the average power is relatively close (e.g., or at, or above) the saturation point 320 and the average power is associated with non-linear distortion at the power amplifier (e.g., the average power is within the severely non-linear operating region 315-c).

In some examples, there may be one or more threshold values for the transmitting device to determine the power amplifier operating mode. For example, the transmitting device may select the operating mode 305-a if the transmitting device determines an average power (e.g., PAPR) of the input waveform is below a first threshold value. Similarly, the transmitting device may select the operating mode 305-c if the average power of the input waveform is above a second threshold value, and the transmitting device may select the operating mode 305-b if the average power of the input waveform is between the first threshold value and the second threshold value.

The transmitting device may transmit a set of reference signals (e.g., a set of one or more DMRSs) for the receiving device to perform channel estimation for an upcoming transmission. Additionally, as described herein, the transmitting device may be configured to transmit an additional set of reference signals to enable non-linear distortion mitigation at the receiving device. For example, a set of one or more low-PAPR DMRSs may be transmitted (e.g., on a first symbol of a slot) by the transmitting device for channel estimation (e.g., linear channel estimation) at the receiving device, and the transmitting device may transmit an additional set of high-PAPR reference signals (e.g., on a second symbol of a slot, prior to an upcoming data transmission) for non-linear distortion mitigation procedures.

As described herein, a resource density for the additional set of reference signals may be based on the determined operating mode 305. For example, the linear operating mode 305-a may be associated with a low resource density, such that relatively few samples of the additional set of reference signals are transmitted (e.g., or, in some cases, no samples are transmitted), thereby reducing overhead in cases where non-linear distortion is low or not present. The moderately non-linear operating mode 305-b may be associated with a relatively higher resource density (e.g., than the operating mode 305-a), which may improve non-linearity estimation at the receiver device relative to the low resource density. Similarly, the severely non-linear operating mode 305-c may be associated with a highest resource density (e.g., relative to the operating mode 305-a and the operating mode 305-b), which may further help the receiving device perform reliable non-linearity estimation.

In some cases, the transmitting device may also consider an MCS level (e.g., a modulation order used for communications between the transmitting device and the receiving device) in determining an operating mode 305 (e.g., a power amplifier operating mode). For example, for a first MCS level (e.g., an MCS index (such as MCS index 1), which may correspond to QPSK techniques), or other relatively-low MCS levels (e.g., relatively-low MCS indices), an associated coding rate may be relatively strong. Accordingly, the receiving device may improve end-to-end performance with a moderate-resource density of the additional set of reference signals, even when the transmitting device is operating with a relatively high level of non-linearity (e.g., using an input waveform with an average power within the operating region 315-c). As such, the transmitting device may select the moderately non-linear operating mode 305-b when communicating with an MCS level of one, despite the relatively high level of non-linearity. Alternatively, the transmitting device may still select (e.g., and indicate to the receiving device) the severely non-linear operating mode 305-c, but may select a relatively lower resource density (e.g., a medium resource density associated with the moderately non-linear operating mode 305-b) for the additional set of reference signals. In these cases, the transmitting device may indicate the lower resource density to the receiving device. Additionally, or alternatively, with an MCS level of one, the receiving device may indicate, to the transmitting device, the relatively lower resource density in response to receiving an indication from the transmitting device indicating the severely non-linear operating mode 305-c (e.g., if the receiving device is a network entity 105).

For relatively higher MCS levels (e.g., an MCS index 27, which may correspond to 64 quadrature amplitude modulation (QAM)), a medium resource density additional set of reference signals may not suffice for performing non-linearity estimation at high levels of non-linearity. As such, the high resource density (e.g., relative to the operating mode 305-a and the operating mode 305-b) may be used for the additional set of reference signals when the transmitting device is operating with the severely non-linear operating mode 305-c.

In some cases, the transmitting device may additionally, or alternatively, consider a non-linear distortion mitigation technique used at the receiving device in determining an operating mode 305. For example, the receiving device may be utilizing digital post-distortion (DPoD) techniques, noise variance adjustment techniques (e.g., techniques based on recurrent neural network (RNN) adjustments), or other techniques for non-linear mitigation. The operating mode 305 may also be based on whether OFDM-based waveforms (e.g., where the additional set of reference signals may be multiplexed with other channels during one OFDM symbol) or SC-based waveforms are being used for transmissions between the transmitting device and the receiving device.

In some examples, if the receiving device is using DPoD techniques and the transmitting device is communicating based on OFDM techniques, the DPoD techniques at the receiving device may experience interference caused by multiplexing of the additional set of reference signals with other channels. Accordingly, the transmitting device may determine a higher operating mode 305 than suggested by an operating region 315 (e.g., the transmitting device may select the severely non-linear operating mode 305-c even when an input waveform for a power amplifier has an average power within the operating region 315-b, or the like). Additionally, or alternatively, the transmitting device may select a higher resource density than the resource density associated with the determined operating mode 305, which may result in the additional set of reference signals being transmitted within a full OFDM symbol (e.g., without multiplexing). In these cases, the transmitting device may indicate the higher resource density to the receiving device, or the receiving device (e.g., a network entity) may indicate the higher resource density to the transmitting device (e.g., in response to receiving an indication of the operating mode 305). Alternatively, if the receiving device is using noise variance adjustment techniques (e.g., techniques based on RNN adjustments) for non-linear distortion mitigation, the additional set of reference signals may be multiplexed with one or more other channels, and the resource density may correspond to the operating mode 305 determined based on the input waveform, as the noise variance adjustment may be relatively less susceptible to interference from the other channels.

In some cases, if the transmitting device is utilizing SC-based techniques (e.g., SC-QAM or DFT-s-OFDM techniques), the additional set of reference signals may be multiplexed on other channels within a single carrier symbol based on including one or more guard periods (e.g., a GI or UW, as described herein with reference to FIG. 2). For example, a guard period may be included adjacent to (e.g., prior to or after) a reference signal of the additional set of reference signals to support time domain multiplexing within the single carrier symbol, which may decrease interference between multiplexing channels and allow for DPoD techniques at the receiving device. In some examples, the transmitting device may discard or refrain from using a guard period if the receiving device is utilizing noise variance adjustments (e.g., RNN-based adjustment), which may be less susceptible to interference from multiplexing channels.

In some examples, the receiving device may indicate the non-linear mitigation technique used at the receiving device to the transmitting device. This may allow for the transmitting device to use the information regarding the non-linear mitigation technique for determining a resource density or an operating mode 305. For example, the receiving device may transmit a message indicating a non-linear distortion mitigation technique (e.g., DPoD or RNN adjustment techniques) to the transmitting device via Layer 1 signaling (e.g., a physical uplink or downlink control channel), Layer 2 signaling (e.g., a MAC-CE message) or Layer 3 signaling (e.g., an RRC message).

Accordingly, by implementing the set of power amplifier operating modes and corresponding resource densities for the additional set of reference signals, the transmitting device may reduce overhead associated with transmitting the additional set of reference signals, especially in cases where conditions affecting non-linearity change relatively frequently.

Figure 4:
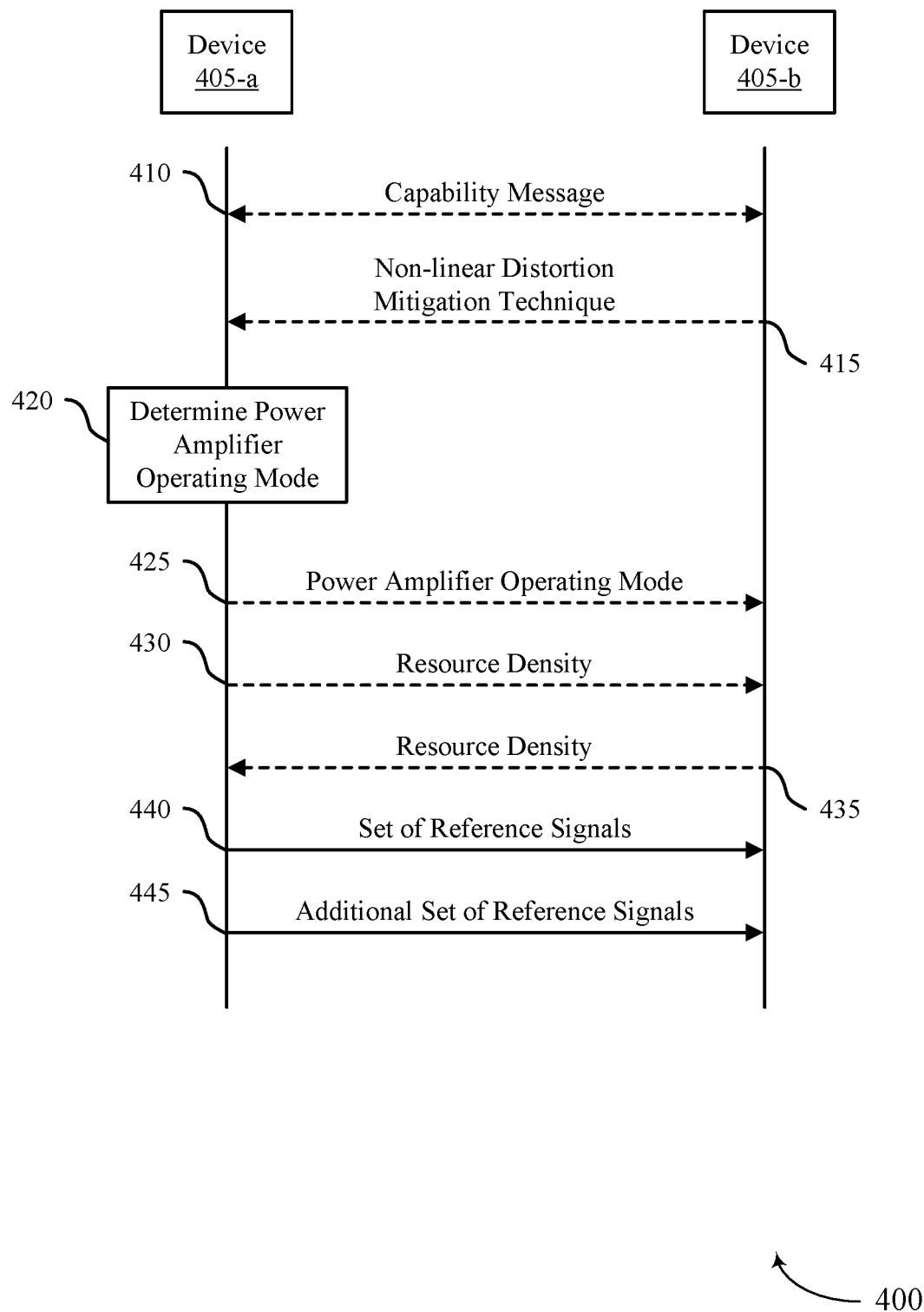
FIG. 4 shows an example of a process flow that supports nonlinear power amplifier operating mode indications in accordance with one or more aspects of the present disclosure.

FIG. 4 shows an example of a process flow 400 that supports nonlinear power amplifier operating mode indications in accordance with one or more aspects of the present disclosure. The process flow 400 may illustrate communications between a device 405-a and a device 405-b, which may be examples of a UE 115 or a network entity 105, as described herein. The device 405-a and the device 405-b may be examples of the device 205-a and the device 205-b, respectively, as described with reference to FIG. 2. Similarly, the device 405-a may be an example of a transmitting device, and the device 405-b may be an example of a receiving device, as described herein with reference to FIG. 3. The device 405-a and the device 405-b may perform actions described herein at different times or in a different order. Similarly, some steps may be added, omitted, or performed in a different order with respect to the process flow 400.

At 410, the device 405-a may transmit a capability message indicating a capability of to the device 405-a to support a set of two or more power amplifier operating modes. For example, such as in cases where the device 405-a is a UE 115 and the device 405-b is a network entity 105, the device 405-a may transmit the capability indication via UE capability information signaling to the device 405-b. Alternatively, the device 405-b may transmit a capability message to the device 405-a to indicate a capability of the device 405-b to support the set of two or more power amplifier operating modes. For example, such as when the device 405-b is a UE 115 and the device 405-a is a network entity 105, the device 405-b may transmit a capability indication (e.g., via UE capability information signaling) to the device 405-a that indicates a capability of the device 205-b to support the set of two or more power amplifier operating modes and receiving an additional set of reference signals with a resource density based on the set of two or more power amplifier operating modes.

At 415, the device 405-b may transmit a message indicating a non-linear distortion mitigation technique (e.g., DPoD or RNN adjustment techniques) used at the device 405-b to the device 405-a. This may allow for the device 405-a to use information regarding the non-linear distortion mitigation technique for determining a resource density or a power amplifier operating mode from the set of two or more power amplifier operating modes. In some examples, the device 405-b may transmit the message indicating the non-linear distortion mitigation technique to the transmitting device via Layer 1 signaling (e.g., a physical uplink or downlink control channel), Layer 2 signaling (e.g., a MAC-CE message) or Layer 3 signaling (e.g., an RRC message).

At 420, the device 405-a may determine a power amplifier operating mode from the set of two or more power amplifier operating modes. The set of two or more power amplifier operating modes may correspond to a level of non-linearity at one or more power amplifiers of the device 405-a. For example, there may be an operating mode corresponding to a fully linear operating mode, a moderately non-linear operating mode, a severely non-linear operating mode, or other levels of non-linearity. In some examples, the device 405-*a* may determine a power amplifier operating mode from the set of two or more power amplifier modes based on an operating region, which may be determined based on a distance from an average power value (e.g., a PAPR value) associated with an input waveform for the one or more power amplifiers and a saturation point associated with the one or more power amplifiers. Additionally, or alternatively, the device 405-*a* may determine a power amplifier operating mode based on an MCS level (e.g., used for communications between the device 405-*a* and the device 405-*b*), the non-linear distortion mitigation technique used at the device 405-*b*, whether OFDM-based waveforms or SC-based waveforms are being used for transmissions between the device 405-*a* and the device 405-*b*, or any combination thereof, as described in more detail herein, with reference to FIG. 3.

The power amplifier operating mode determined by the device 405-*a* may be associated with a resource density (e.g., a time domain density, a frequency domain density, or both) for an additional set of reference signals (e.g., a high-PAPR reference signals), as described herein with reference to FIGS. 2 and 3. For example, a lower resource density may be used for the additional set of reference signals when the power amplifier operating mode corresponds to a lower level of non-linearity, which may reduce transmission overhead at the device 405-*a* and the device 405-*b*. Alternatively, a higher resource density may be used for the additional set of reference signals when the power amplifier operating mode corresponds to a higher level of non-linearity, which may improve non-linear distortion mitigation or estimation at the device 405-*b*.

At 425, the device 405-*a* may transmit a message indicating the determined power amplifier operating mode to the device 405-*b*. The message indicating the power amplifier operating mode may be a dynamic indication (e.g., a Layer 1 indication via DCI, or a Layer 2 indication via MAC-CE) or a static indication (e.g., a Layer 3 indication via RRC). In some examples, the device 405-*b* may determine a resource density for reception of the additional set of reference signals based on the indication of the power amplifier operating mode.

At 430, the device 405-*a* may transmit a message indicating a resource density for the additional set of reference signals to the device 405-*b*. In some examples, the resource density may be indicated in the same message indicating the power amplifier operating mode (e.g., at 425). In some cases, at 435, the device 405-*b* may instead transmit a message indicating a resource density for the additional set of reference signals to the device 405-*a*. For example, the device 405-*b* may transmit the message indicating the resource density in response to receiving the message indicating the power amplifier operating mode. The message indicating the resource density may be a dynamic indication (e.g., a Layer 1 indication via DCI, or a Layer 2 indication via MAC-CE) or a static indication (e.g., a Layer 3 indication via RRC). In some examples, the message indicating the resource density may also include an indication of one or more resources (e.g., time resources, frequency resource, or both) for transmission of the additional set of reference signals.

At 440, the device 405-*a* may transmit a set of reference signals (e.g., a set of DMRSs) to the device 405-*b*. The set of reference signals may be associated with estimation of a wireless channel by the device 405-*b* for a transmission by the device 405-*a*. In some examples, the set of reference signals may correspond to a set of low-PAPR reference signals (e.g., DMRSs).

At 445, the device 405-*a* may transmit the additional set of reference signals (e.g., high-PAPR reference signals) based on the power amplifier operating mode in accordance with the resource density and any indicated resources (e.g., time resources, frequency resources, or both). In some examples, the device 405-*a* may multiplex the additional set of reference signals in a frequency domain, a time domain, or both. For example, the device 405-*a* may multiplex the additional set of reference signals based on a composite time domain signal associated with the multiplexed transmission, the power amplifier operating mode, the non-linear distortion mitigation technique used at the device 405-*b*, a guard period being adjacent to an occasion for transmitting a reference signal of the additional set of reference signals (e.g., in the time domain), or any combination thereof, as described in more detail herein with reference to FIGS. 2 and 3.

Accordingly, by implementing the set of two or more operating modes and corresponding resource densities for the additional set of reference signals, the device 405-*a* may reduce overhead associated with transmitting the additional set of reference signals, especially in cases where conditions affecting non-linearity change relatively frequently.

Figure 5:
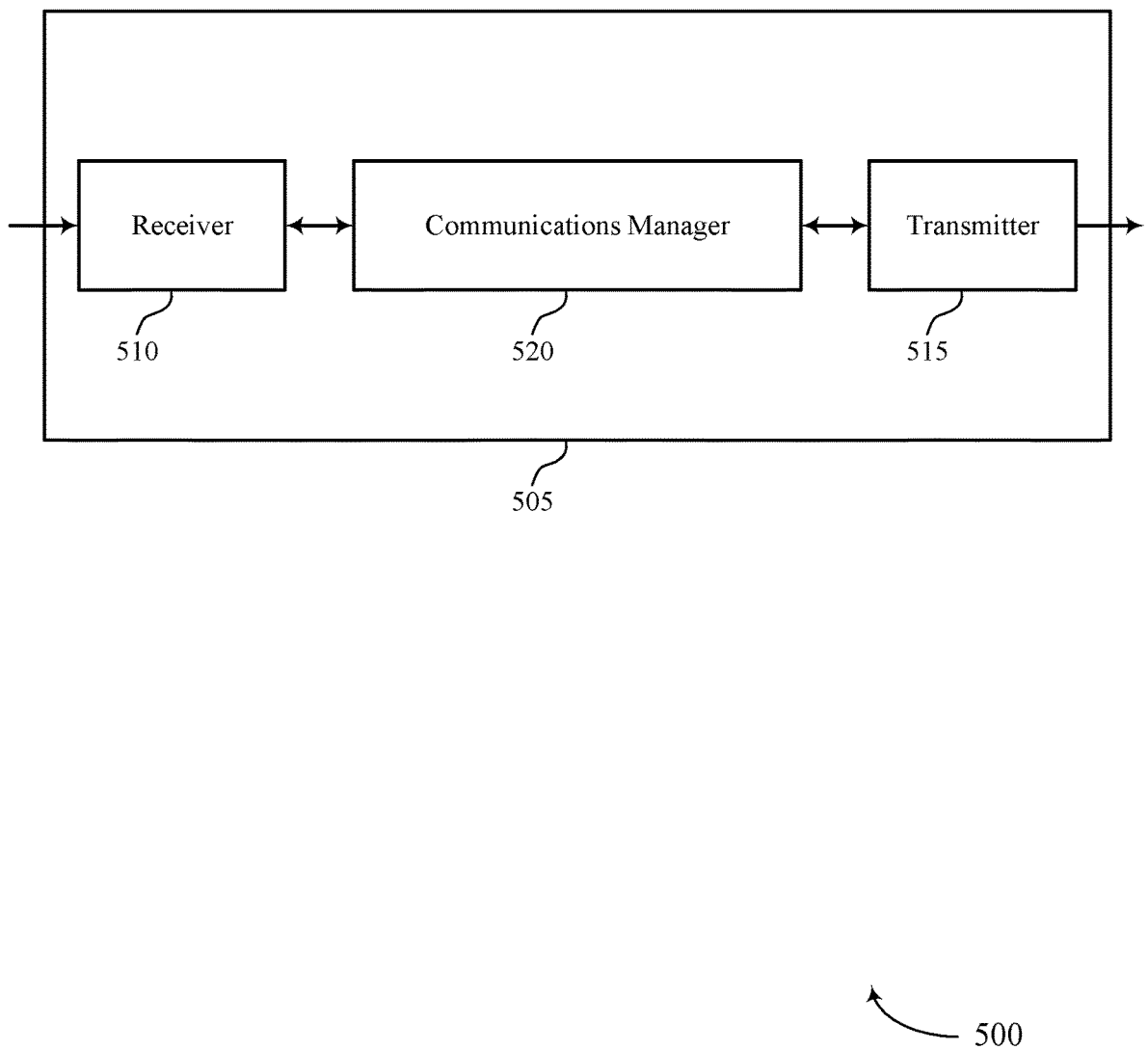
FIGS. 5 and 6 show block diagrams of devices that support nonlinear power amplifier operating mode indications in accordance with one or more aspects of the present disclosure.

FIG. 5 shows a block diagram 500 of a device 505 that supports nonlinear power amplifier operating mode indications in accordance with one or more aspects of the present disclosure. The device 505 may be an example of aspects of a UE 115 or a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to nonlinear power amplifier operating mode indication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to nonlinear power amplifier operating mode indication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of nonlinear power amplifier operating mode indications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for determining a power amplifier operating mode associated with non-linear distortion of an input waveform for a power amplifier, where the power amplifier operating mode is from a set of two or more power amplifier operating modes each associated with respective amounts of the non-linear distortion. The communications manager 520 is capable of, configured to, or operable to support a means for transmitting a set of reference signals associated with estimation of a wireless channel for a transmission. The communications manager 520 is capable of, configured to, or operable to support a means for transmitting an additional set of reference signals associated with non-linear distortion mitigation for the transmission, where a resource density of the additional set of reference signals is based on the power amplifier operating mode.

Additionally, or alternatively, the communications manager 520 may support wireless communication at a receiving device in accordance with examples as disclosed herein. For example, the communications manager 520 is capable of, configured to, or operable to support a means for receiving, from a first device, a first message indicating a power amplifier operating mode associated with non-linear distortion of an input waveform for a power amplifier of the first device, where the power amplifier operating mode is from a set of two or more power amplifier operating modes each associated with respective amounts of the non-linear distortion. The communications manager 520 is capable of, configured to, or operable to support a means for measuring a set of reference signals associated with estimation of a wireless channel for a transmission by the first device. The communications manager 520 is capable of, configured to, or operable to support a means for measuring an additional set of reference signals associated with non-linear distortion mitigation for the transmission, where a resource density of the additional set of reference signals is based on the power amplifier operating mode.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for nonlinear power amplifier operating mode indications with reduced power consumption and more efficient utilization of communication resources.

Figure 6:
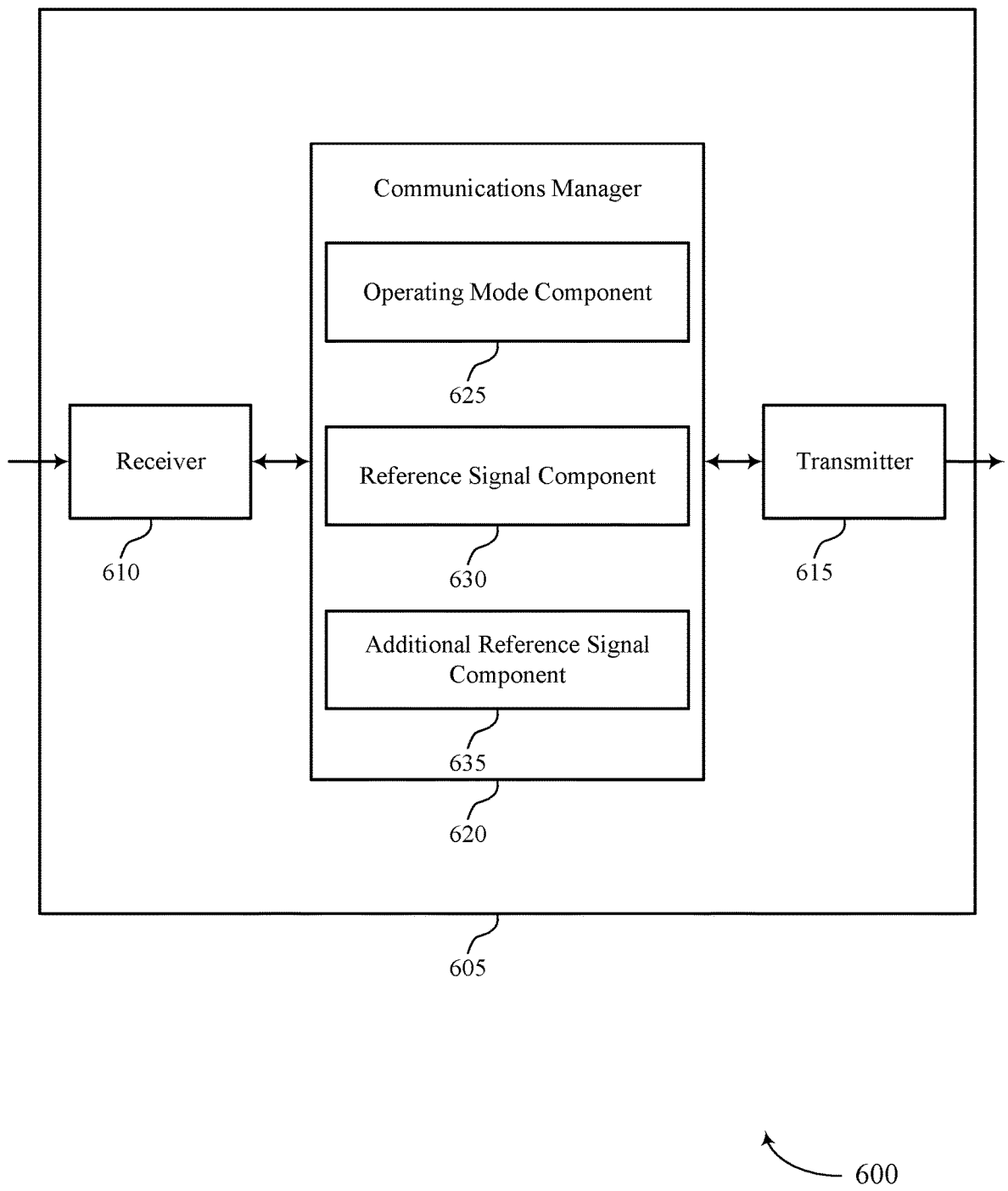

FIG. 6 shows a block diagram 600 of a device 605 that supports nonlinear power amplifier operating mode indications in accordance with one or more aspects of the present disclosure. The device 605 may be an example of aspects of a device 505, a UE 115, or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to nonlinear power amplifier operating mode indication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to nonlinear power amplifier operating mode indication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of nonlinear power amplifier operating mode indications as described herein. For example, the communications manager 620 may include an operating mode component 625, a reference signal component 630, an additional reference signal component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The operating mode component 625 is capable of, configured to, or operable to support a means for determining a power amplifier operating mode associated with non-linear distortion of an input waveform for a power amplifier, where the power amplifier operating mode is from a set of two or more power amplifier operating modes each associated with respective amounts of the non-linear distortion. The reference signal component 630 is capable of, configured to, or operable to support a means for transmitting a set of reference signals associated with estimation of a wireless channel for a transmission. The additional reference signal component 635 is capable of, configured to, or operable to support a means for transmitting an additional set of reference signals associated with non-linear distortion mitigation for the transmission, where a resource density of the additional set of reference signals is based on the power amplifier operating mode.

Additionally, or alternatively, the communications manager 620 may support wireless communication at a receiving device in accordance with examples as disclosed herein. The operating mode component 625 is capable of, configured to, or operable to support a means for receiving, from a first device, a first message indicating a power amplifier operating mode associated with non-linear distortion of an input waveform for a power amplifier of the first device, where the power amplifier operating mode is from a set of two or more power amplifier operating modes each associated with respective amounts of the non-linear distortion. The reference signal component 630 is capable of, configured to, or operable to support a means for measuring a set of reference signals associated with estimation of a wireless channel for a transmission by the first device. The additional reference signal component 635 is capable of, configured to, or operable to support a means for measuring an additional set of reference signals associated with non-linear distortion mitigation for the transmission, where a resource density of the additional set of reference signals is based on the power amplifier operating mode.

Figure 7:
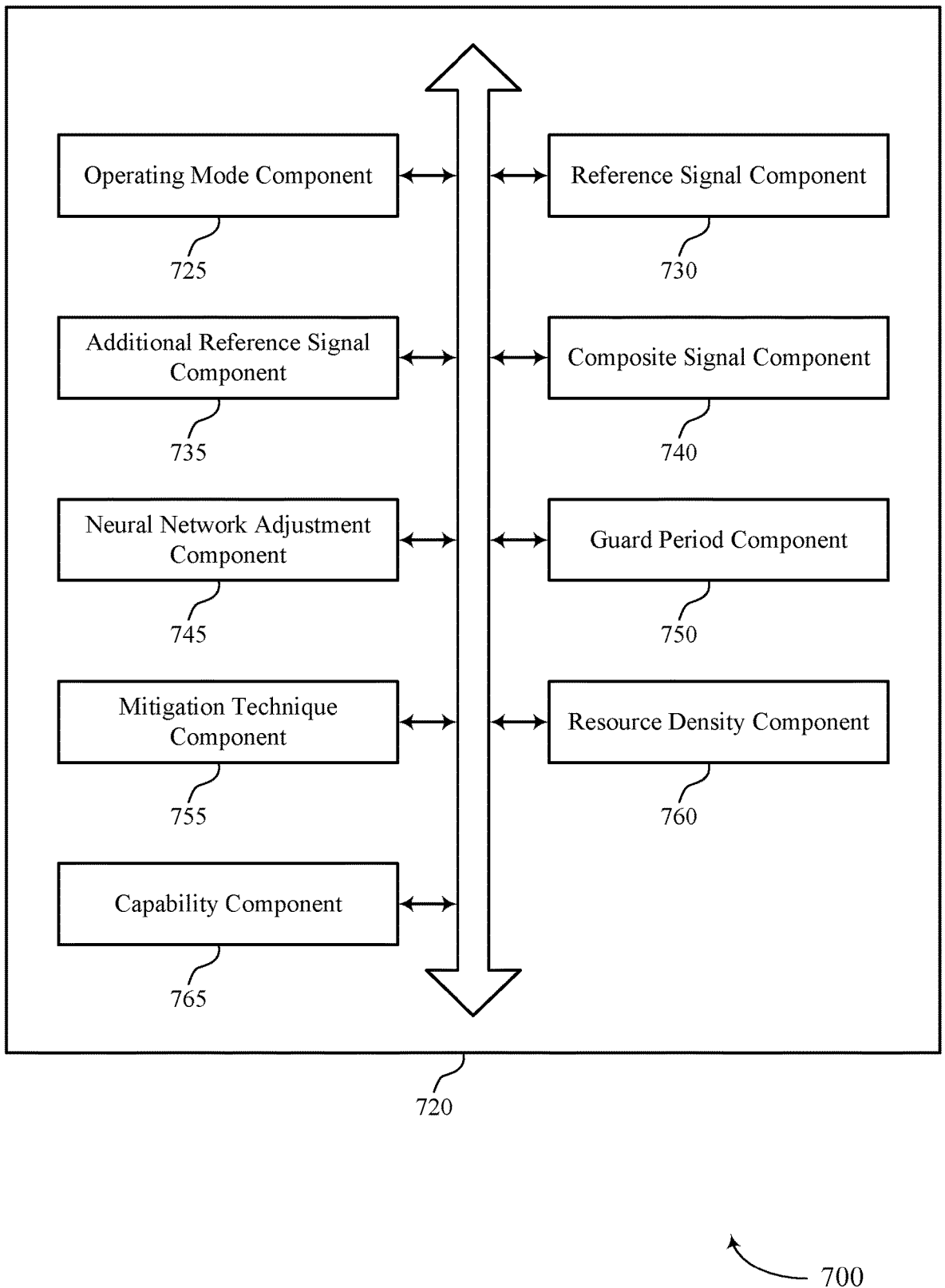
FIG. 7 shows a block diagram of a communications manager that supports nonlinear power amplifier operating mode indications in accordance with one or more aspects of the present disclosure.

FIG. 7 shows a block diagram 700 of a communications manager 720 that supports nonlinear power amplifier operating mode indications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of nonlinear power amplifier operating mode indications as described herein. For example, the communications manager 720 may include an operating mode component 725, a reference signal component 730, an additional reference signal component 735, a composite signal component 740, a neural network adjustment component 745, a guard period component 750, a mitigation technique component 755, a resource density component 760, a capability component 765, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communication in accordance with examples as disclosed herein. The operating mode component 725 is capable of, configured to, or operable to support a means for determining a power amplifier operating mode associated with non-linear distortion of an input waveform for a power amplifier, where the power amplifier operating mode is from a set of two or more power amplifier operating modes each associated with respective amounts of the non-linear distortion. The reference signal component 730 is capable of, configured to, or operable to support a means for transmitting a set of reference signals associated with estimation of a wireless channel for a transmission. The additional reference signal component 735 is capable of, configured to, or operable to support a means for transmitting an additional set of reference signals associated with non-linear distortion mitigation for the transmission, where a resource density of the additional set of reference signals is based on the power amplifier operating mode.

In some examples, the operating mode component 725 is capable of, configured to, or operable to support a means for transmitting a first message indicating the power amplifier operating mode, where transmitting the additional set of reference signals is based on transmitting the first message indicating the power amplifier operating mode.

In some examples, the resource density component 760 is capable of, configured to, or operable to support a means for receiving a second message that indicates the resource density of the additional set of reference signals in response to transmitting the first message indicating the power amplifier operating mode, where transmitting the additional set of reference signals is based on receiving the second message that indicates the resource density.

In some examples, the resource density component 760 is capable of, configured to, or operable to support a means for transmitting, within the first message, an indication of the resource density of the additional set of reference signals based on determining the power amplifier operating mode.

In some examples, the capability component 765 is capable of, configured to, or operable to support a means for transmitting a capability message indicating a capability to support the set of two or more power amplifier operating modes, where transmitting the first message that indicates the power amplifier operating mode is based on the capability.

In some examples, the power amplifier operating mode is determined based on an average power of the input waveform being above a threshold value, and the resource density of the additional set of reference signals includes a first resource density.

In some examples, the power amplifier operating mode is determined based on an average power of the input waveform being below a threshold value, and the resource density of the additional set of reference signals includes a second density.

In some examples, the power amplifier operating mode is determined based on a peak-to-average power ratio of the input waveform, a modulation and coding scheme, an operating point associated with the power amplifier, a resource block allocation, a bandwidth associated with the transmission, or any combination thereof.

In some examples, the composite signal component 740 is capable of, configured to, or operable to support a means for multiplexing the transmission in a frequency domain for communication with a set of multiple receiving devices, where determining the power amplifier operating mode is based on a composite time domain signal associated with the multiplexed transmission.

In some examples, the operating mode component 725 is capable of, configured to, or operable to support a means for multiplexing the additional set of reference signals in a time domain, a frequency domain, or both, based on the power amplifier operating mode.

In some examples, the neural network adjustment component 745 is capable of, configured to, or operable to support a means for multiplexing the additional set of reference signals in a time domain, a frequency domain, or both, based on a neural network adjustment at a receiving device for the non-linear distortion mitigation.

In some examples, the guard period component 750 is capable of, configured to, or operable to support a means for multiplexing the additional set of reference signals in a time domain, a frequency domain, or both, based on a guard period being adjacent to an occasion for transmitting a reference signal of the additional set of reference signals in the time domain.

In some examples, the guard period component 750 is capable of, configured to, or operable to support a means for discarding a guard time associated with transmitting the additional set of reference signals based on a recurrent neural network adjustment being used at a receiving device for the non-linear distortion mitigation.

In some examples, the mitigation technique component 755 is capable of, configured to, or operable to support a means for receiving a third message including an indication of a non-linear distortion mitigation technique used at a receiving device, where the resource density is based on the non-linear distortion mitigation technique.

Additionally, or alternatively, the communications manager 720 may support wireless communication at a receiving device in accordance with examples as disclosed herein. In some examples, the operating mode component 725 is capable of, configured to, or operable to support a means for receiving, from a first device, a first message indicating a power amplifier operating mode associated with non-linear distortion of an input waveform for a power amplifier of the first device, where the power amplifier operating mode is from a set of two or more power amplifier operating modes each associated with respective amounts of the non-linear distortion. In some examples, the reference signal component 730 is capable of, configured to, or operable to support a means for measuring a set of reference signals associated with estimation of a wireless channel for a transmission by the first device. In some examples, the additional reference signal component 735 is capable of, configured to, or operable to support a means for measuring an additional set of reference signals associated with non-linear distortion mitigation for the transmission, where a resource density of the additional set of reference signals is based on the power amplifier operating mode.

In some examples, the resource density component 760 is capable of, configured to, or operable to support a means for receiving, within the first message, an indication of the resource density of the additional set of reference signals, where the resource density is based on the power amplifier operating mode.

In some examples, the resource density component 760 is capable of, configured to, or operable to support a means for transmitting, to the first device, a second message that indicates the resource density of the additional set of reference signals in response to receiving the first message indicating the power amplifier operating mode, where measuring the additional set of reference signals is based on transmitting the second message that indicates the resource density.

In some examples, the capability component 765 is capable of, configured to, or operable to support a means for receiving a capability message indicating a capability of a transmitting device to support the set of two or more power amplifier operating modes, where the power amplifier operating mode is based on the capability of the transmitting device.

In some examples, the power amplifier operating mode is based on an average power of the input waveform being above a threshold value, and the resource density of the additional set of reference signals includes a first resource density.

In some examples, the power amplifier operating mode is based on an average power of the input waveform being below a threshold value, and the resource density of the additional set of reference signals includes a second density.

In some examples, the power amplifier operating mode is based on a PAPR of the input waveform, an MCS, an operating point associated with the power amplifier, a resource block allocation, a bandwidth associated with the transmission, or any combination thereof.

In some examples, the composite signal component 740 is capable of, configured to, or operable to support a means for receiving the transmission, where the transmission is multiplexed in a frequency domain for communication with a set of multiple receiving devices and the power amplifier operating mode is based on a composite time domain signal associated with the transmission.

In some examples, the additional set of reference signals is multiplexed in a time domain, a frequency domain, or both, based on the power amplifier operating mode. In some examples, the additional set of reference signals is multiplexed in a time domain, a frequency domain, or both, based on a neural network adjustment being used at the receiving device for the non-linear distortion mitigation.

In some examples, the additional set of reference signals is multiplexed in a time domain, a frequency domain, or both, based on a guard period being adjacent to an occasion for transmitting a reference signal of the additional set of reference signals in a time domain.

In some examples, the mitigation technique component 755 is capable of, configured to, or operable to support a means for transmitting a third message including an indication of a non-linear distortion mitigation technique used at the receiving device, where the resource density is based on the non-linear distortion mitigation technique.

Figure 8:
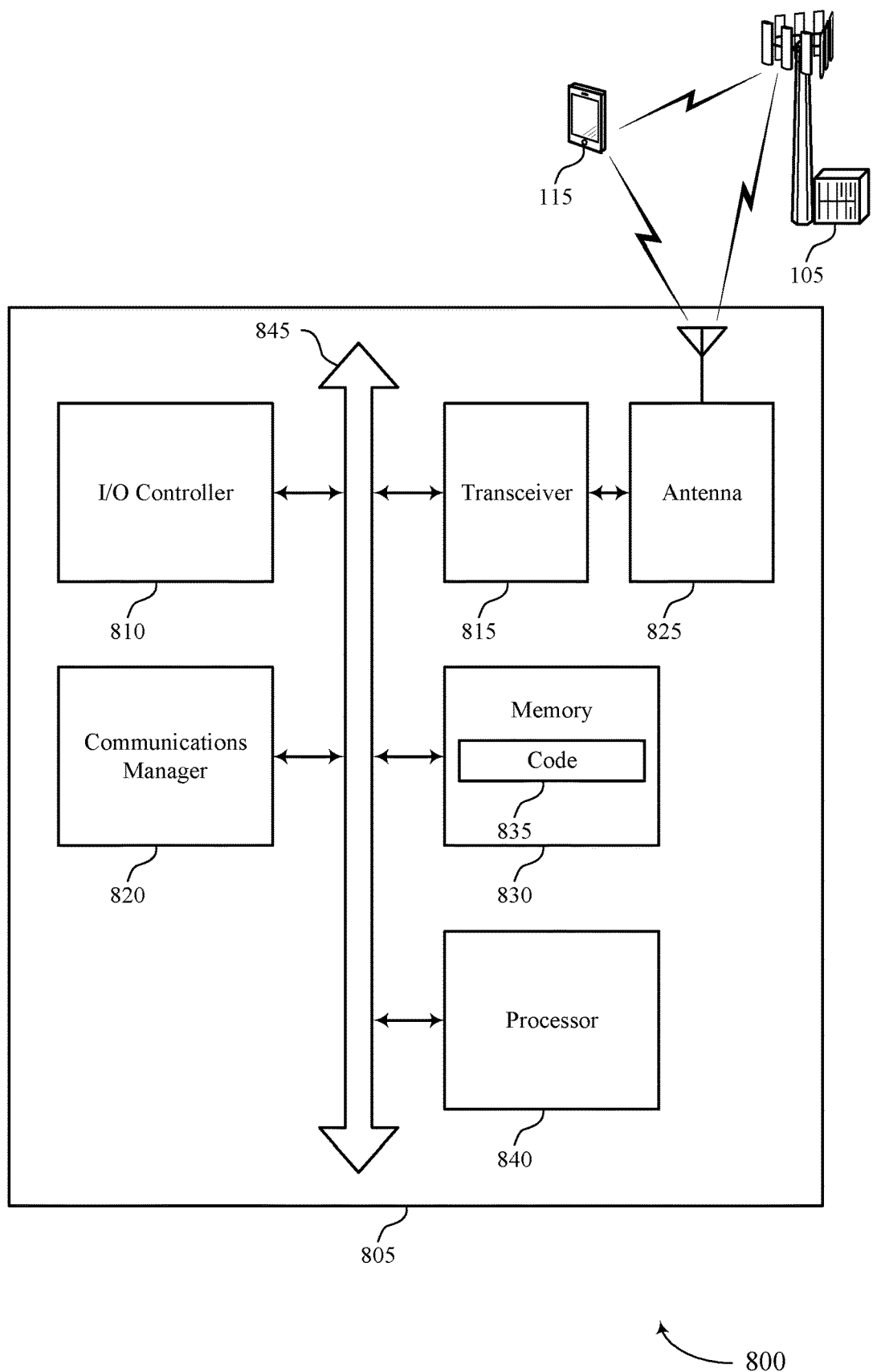
FIG. 8 shows a diagram of a system including a UE that supports nonlinear power amplifier operating mode indications in accordance with one or more aspects of the present disclosure.

FIG. 8 shows a diagram of a system 800 including a device 805 that supports nonlinear power amplifier operating mode indications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting non-linear power amplifier operating mode indication). For example, the device 805 or a component of the device 805 may include a processor 840 and memory 830 coupled with or to the processor 840, the processor 840 and memory 830 configured to perform various functions described herein.

The communications manager 820 may support wireless communication in accordance with examples as disclosed herein. For example, the communications manager 820 is capable of, configured to, or operable to support a means for determining a power amplifier operating mode associated with non-linear distortion of an input waveform for a power amplifier, where the power amplifier operating mode is from a set of two or more power amplifier operating modes each associated with respective amounts of the non-linear distortion. The communications manager 820 is capable of, configured to, or operable to support a means for transmitting a set of reference signals associated with estimation of a wireless channel for a transmission. The communications manager 820 is capable of, configured to, or operable to support a means for transmitting an additional set of reference signals associated with non-linear distortion mitigation for the transmission, where a resource density of the additional set of reference signals is based on the power amplifier operating mode.

Additionally, or alternatively, the communications manager 820 may support wireless communication at a receiving device in accordance with examples as disclosed herein. For example, the communications manager 820 is capable of, configured to, or operable to support a means for receiving, from a first device, a first message indicating a power amplifier operating mode associated with non-linear distortion of an input waveform for a power amplifier of the first device, where the power amplifier operating mode is from a set of two or more power amplifier operating modes each associated with respective amounts of the non-linear distortion. The communications manager 820 is capable of, configured to, or operable to support a means for measuring a set of reference signals associated with estimation of a wireless channel for a transmission by the first device. The communications manager 820 is capable of, configured to, or operable to support a means for measuring an additional set of reference signals associated with non-linear distortion mitigation for the transmission, where a resource density of the additional set of reference signals is based on the power amplifier operating mode.

By including or configuring the communications manager 820 in accordance with examples as described herein, the device 805 may support techniques for nonlinear power amplifier operating mode indications with reduced power consumption and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of nonlinear power amplifier operating mode indications as described herein, or the processor 840 and the memory 830 may be otherwise configured to perform or support such operations.

Figure 9:
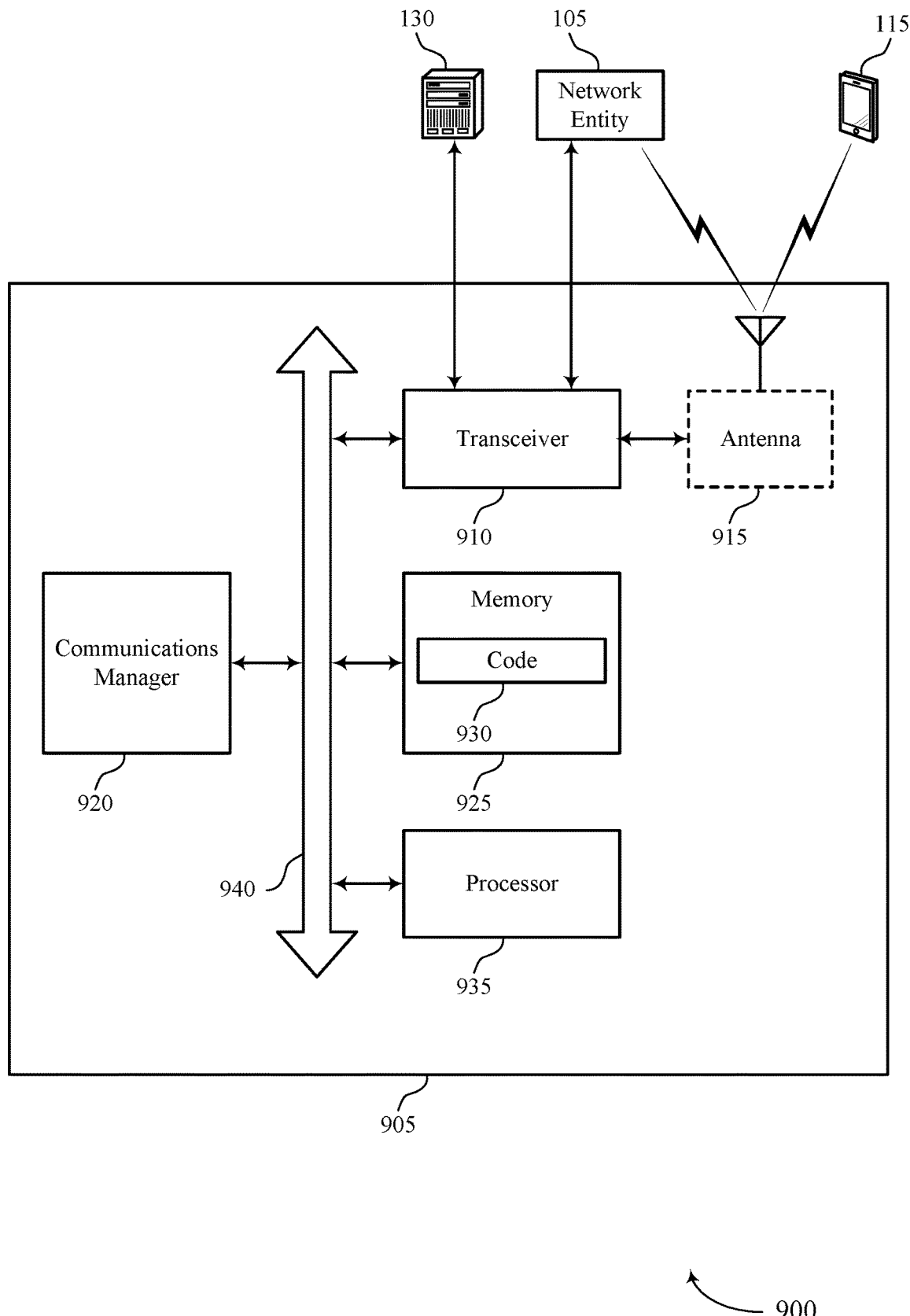
FIG. 9 shows a diagram of a system including a network entity that supports nonlinear power amplifier operating mode indications in accordance with one or more aspects of the present disclosure.

FIG. 9 shows a diagram of a system 900 including a device 905 that supports nonlinear power amplifier operating mode indications in accordance with one or more aspects of the present disclosure. The device 905 may be an example of or include the components of a device 505, a device 605, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, a memory 925, code 930, and a processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or memory components (for example, the processor 935, or the memory 925, or both), may be included in a chip or chip assembly that is installed in the device 905. In some examples, the transceiver may be operable to support communications via one or more communications links (e.g., a communication link 125, a backhaul communication link 120, a midhaul communication link 162, a fronthaul communication link 168).

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some cases, the code 930 may not be directly executable by the processor 935 but may cause a computer (e.g., when compiled and executed) to perform functions described herein. In some cases, the memory 925 may contain, among other things, a BIOS which may control basic hardware or software operation such as the interaction with peripheral components or devices.

The processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory 925) to cause the device 905 to perform various functions (e.g., functions or tasks supporting nonlinear power amplifier operating mode indication). For example, the device 905 or a component of the device 905 may include a processor 935 and memory 925 coupled with the processor 935, the processor 935 and memory 925 configured to perform various functions described herein. The processor 935 may be an example of a cloud-computing platform (e.g., one or more physical nodes and supporting software such as operating systems, virtual machines, or container instances) that may host the functions (e.g., by executing code 930) to perform the functions of the device 905. The processor 935 may be any one or more suitable processors capable of executing scripts or instructions of one or more software programs stored in the device 905 (such as within the memory 925). In some implementations, the processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or sub-components of the device 905, such as the processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the memory 925, the code 930, and the processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communication in accordance with examples as disclosed herein. For example, the communications manager 920 is capable of, configured to, or operable to support a means for determining a power amplifier operating mode associated with non-linear distortion of an input waveform for a power amplifier, where the power amplifier operating mode is from a set of two or more power amplifier operating modes each associated with respective amounts of the non-linear distortion. The communications manager 920 is capable of, configured to, or operable to support a means for transmitting a set of reference signals associated with estimation of a wireless channel for a transmission. The communications manager 920 is capable of, configured to, or operable to support a means for transmitting an additional set of reference signals associated with non-linear distortion mitigation for the transmission, where a resource density of the additional set of reference signals is based on the power amplifier operating mode.

Additionally, or alternatively, the communications manager 920 may support wireless communication at a receiving device in accordance with examples as disclosed herein. For example, the communications manager 920 is capable of, configured to, or operable to support a means for receiving, from a first device, a first message indicating a power amplifier operating mode associated with non-linear distortion of an input waveform for a power amplifier of the first device, where the power amplifier operating mode is from a set of two or more power amplifier operating modes each associated with respective amounts of the non-linear distortion. The communications manager 920 is capable of, configured to, or operable to support a means for measuring a set of reference signals associated with estimation of a wireless channel for a transmission by the first device. The communications manager 920 is capable of, configured to, or operable to support a means for measuring an additional set of reference signals associated with non-linear distortion mitigation for the transmission, where a resource density of the additional set of reference signals is based on the power amplifier operating mode.

By including or configuring the communications manager 920 in accordance with examples as described herein, the device 905 may support techniques for nonlinear power amplifier operating mode indications with reduced power consumption and more efficient utilization of communication resources. In particular, reference signal densities may be based on evaluated amounts of nonlinear distortion at a power amplifier of a transmitting device, thereby enabling dynamic and efficient nonlinearity In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, the processor 935, the memory 925, the code 930, or any combination thereof. For example, the code 930 may include instructions executable by the processor 935 to cause the device 905 to perform various aspects of nonlinear power amplifier operating mode indications as described herein, or the processor 935 and the memory 925 may be otherwise configured to perform or support such operations.

Figure 10:
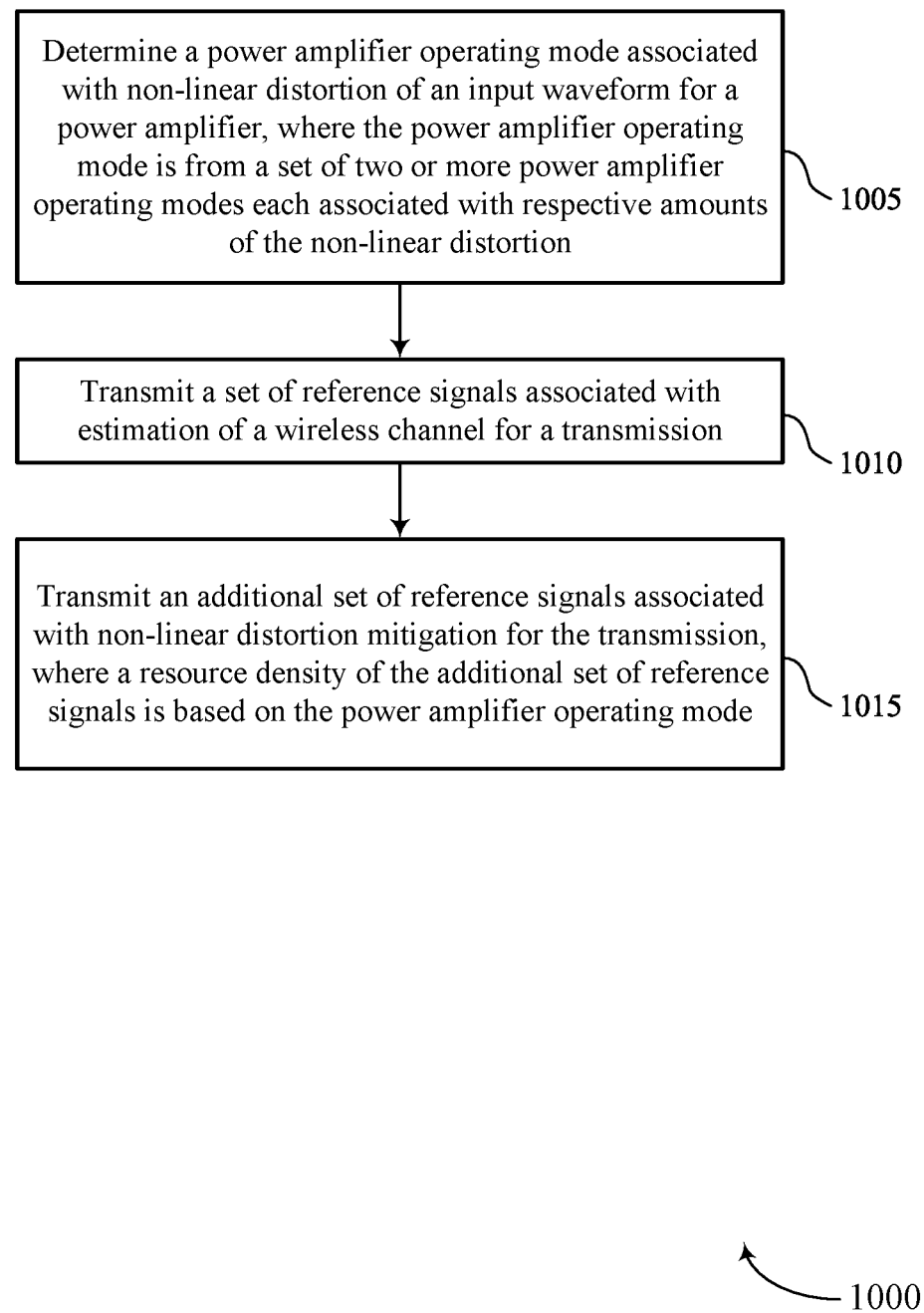
FIGS. 10 through 13 show flowcharts illustrating methods that support nonlinear power amplifier operating mode indications in accordance with one or more aspects of the present disclosure.

FIG. 10 shows a flowchart illustrating a method 1000 that supports nonlinear power amplifier operating mode indications in accordance with examples as described herein. The operations of the method 1000 may be implemented by a UE or a network entity or its components as described herein. For example, the operations of the method 1000 may be performed by a UE 115 or a network entity as described with reference to FIGS. 1 through 9. In some examples, a UE or a network entity may execute a set of instructions to control the functional elements of the wireless UE or the wireless network entity to perform the described functions. Additionally, or alternatively, the wireless UE or the wireless network entity may perform aspects of the described functions using special-purpose hardware.

At 1005, the method may include determining a power amplifier operating mode associated with non-linear distortion of an input waveform for a power amplifier, where the power amplifier operating mode is from a set of two or more power amplifier operating modes each associated with respective amounts of the non-linear distortion. The operations of 1005 may be performed in accordance with examples as disclosed herein. In some examples, aspects of the operations of 1005 may be performed by an operating mode component 725 as described with reference to FIG. 7.

At 1010, the method may include transmitting a set of reference signals associated with estimation of a wireless channel for a transmission. The operations of 1010 may be performed in accordance with examples as disclosed herein. In some examples, aspects of the operations of 1010 may be performed by a reference signal component 730 as described with reference to FIG. 7.

At 1015, the method may include transmitting an additional set of reference signals associated with non-linear distortion mitigation for the transmission, where a resource density of the additional set of reference signals is based on the power amplifier operating mode. The operations of 1015 may be performed in accordance with examples as disclosed herein. In some examples, aspects of the operations of 1015 may be performed by an additional reference signal component 735 as described with reference to FIG. 7.

Figure 11:
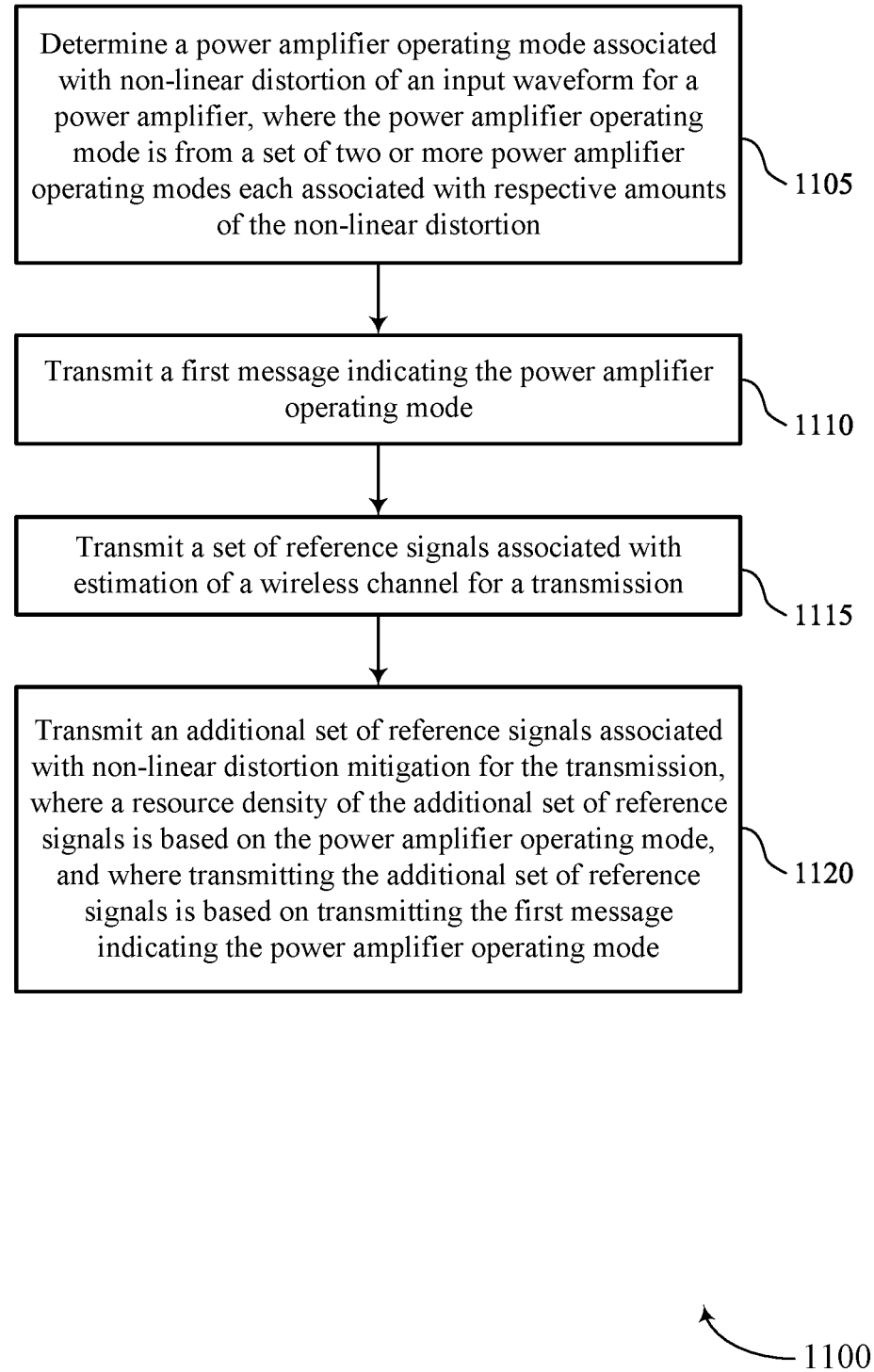

FIG. 11 shows a flowchart illustrating a method 1100 that supports nonlinear power amplifier operating mode indications in accordance with examples as described herein. The operations of the method 1100 may be implemented by a UE or a network entity or its components as described herein. For example, the operations of the method 1100 may be performed by a UE 115 or a network entity as described with reference to FIGS. 1 through 9. In some examples, a UE or a network entity may execute a set of instructions to control the functional elements of the wireless UE or the wireless network entity to perform the described functions. Additionally, or alternatively, the wireless UE or the wireless network entity may perform aspects of the described functions using special-purpose hardware.

At 1105, the method may include determining a power amplifier operating mode associated with non-linear distortion of an input waveform for a power amplifier, where the power amplifier operating mode is from a set of two or more power amplifier operating modes each associated with respective amounts of the non-linear distortion. The operations of 1105 may be performed in accordance with examples as disclosed herein. In some examples, aspects of the operations of 1105 may be performed by an operating mode component 725 as described with reference to FIG. 7.

At 1110, the method may include transmitting a first message indicating the power amplifier operating mode. The operations of 1110 may be performed in accordance with examples as disclosed herein. In some examples, aspects of the operations of 1110 may be performed by an operating mode component 725 as described with reference to FIG. 7.

At 1115, the method may include transmitting a set of reference signals associated with estimation of a wireless channel for a transmission. The operations of 1115 may be performed in accordance with examples as disclosed herein. In some examples, aspects of the operations of 1115 may be performed by a reference signal component 730 as described with reference to FIG. 7.

At 1120, the method may include transmitting an additional set of reference signals associated with non-linear distortion mitigation for the transmission, where a resource density of the additional set of reference signals is based on the power amplifier operating mode, and where transmitting the additional set of reference signals is based on transmitting the first message indicating the power amplifier operating mode. The operations of 1120 may be performed in accordance with examples as disclosed herein. In some examples, aspects of the operations of 1120 may be performed by an additional reference signal component 735 as described with reference to FIG. 7.

Figure 12:
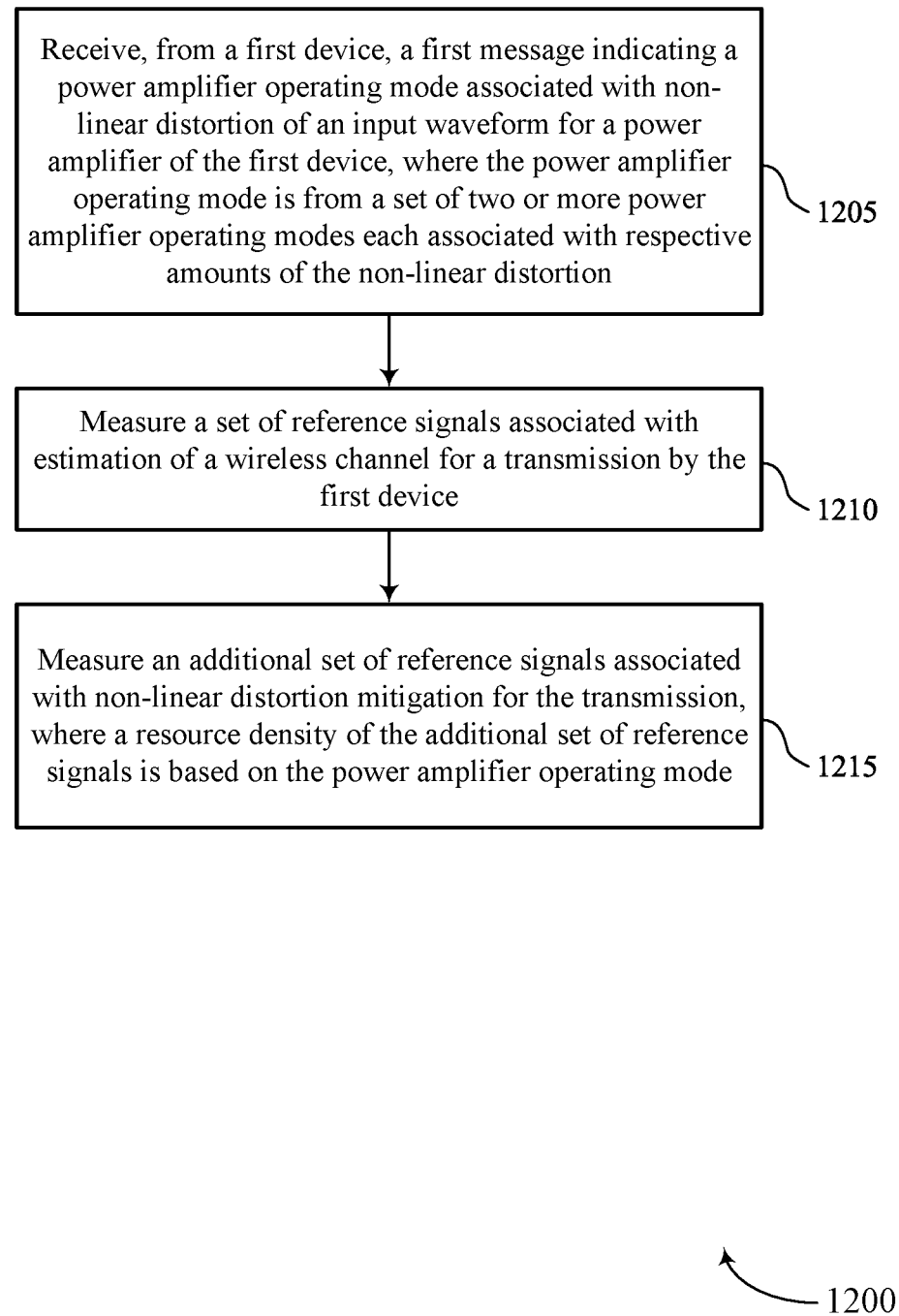

FIG. 12 shows a flowchart illustrating a method 1200 that supports nonlinear power amplifier operating mode indications in accordance with examples as described herein. The operations of the method 1200 may be implemented by a UE or a network entity or its components as described herein. For example, the operations of the method 1200 may be performed by a UE 115 or a network entity as described with reference to FIGS. 1 through 9. In some examples, a UE or a network entity may execute a set of instructions to control the functional elements of the wireless UE or the wireless network entity to perform the described functions. Additionally, or alternatively, the wireless UE or the wireless network entity may perform aspects of the described functions using special-purpose hardware.

At 1205, the method may include receiving, from a first device, a first message indicating a power amplifier operating mode associated with non-linear distortion of an input waveform for a power amplifier of the first device, where the power amplifier operating mode is from a set of two or more power amplifier operating modes each associated with respective amounts of the non-linear distortion. The operations of 1205 may be performed in accordance with examples as disclosed herein. In some examples, aspects of the operations of 1205 may be performed by an operating mode component 725 as described with reference to FIG. 7.

At 1210, the method may include measuring a set of reference signals associated with estimation of a wireless channel for a transmission by the first device. The operations of 1210 may be performed in accordance with examples as disclosed herein. In some examples, aspects of the operations of 1210 may be performed by a reference signal component 730 as described with reference to FIG. 7.

At 1215, the method may include measuring an additional set of reference signals associated with non-linear distortion mitigation for the transmission, where a resource density of the additional set of reference signals is based on the power amplifier operating mode. The operations of 1215 may be performed in accordance with examples as disclosed herein. In some examples, aspects of the operations of 1215 may be performed by an additional reference signal component 735 as described with reference to FIG. 7.

Figure 13:
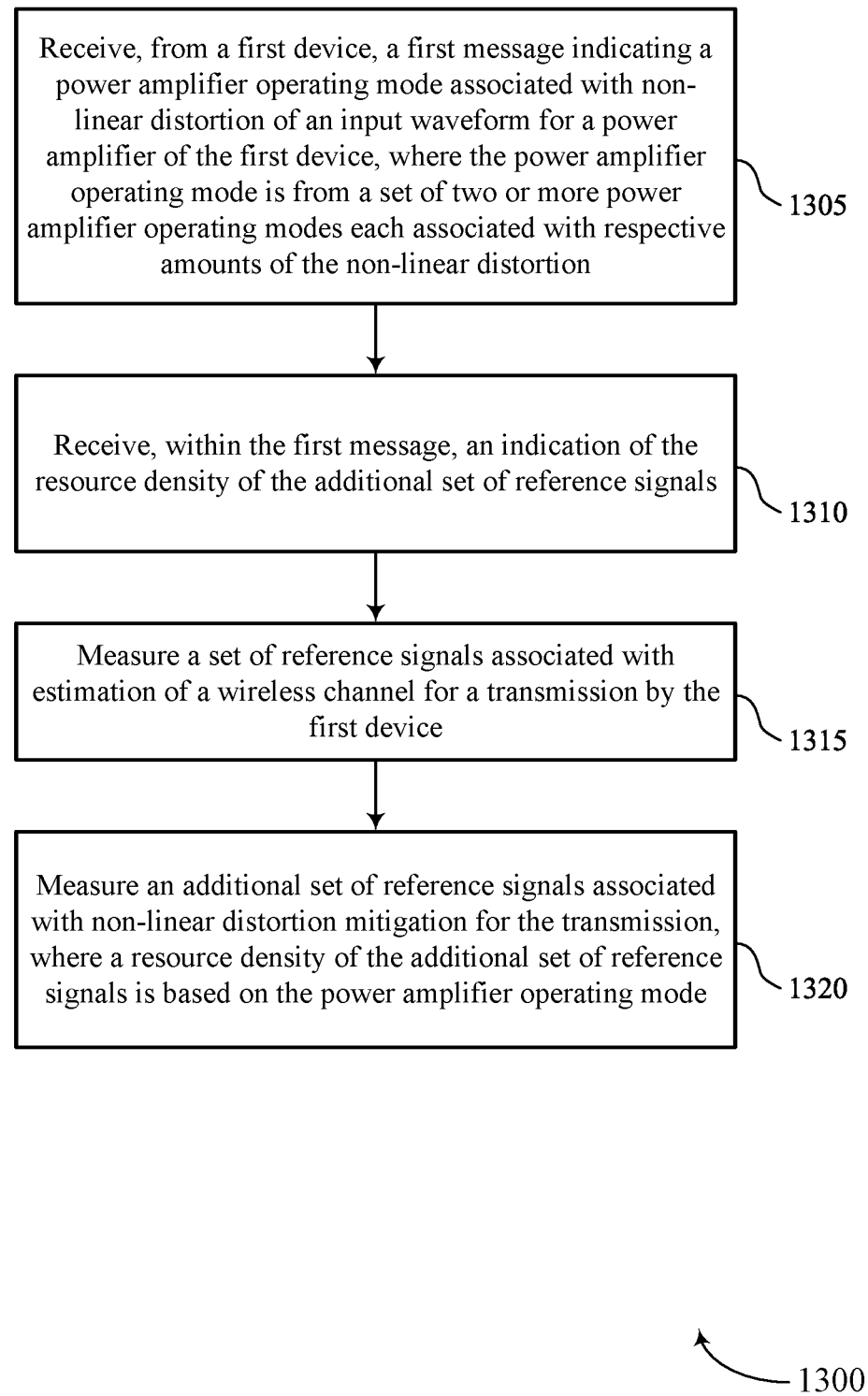

FIG. 13 shows a flowchart illustrating a method 1300 that supports nonlinear power amplifier operating mode indications in accordance with examples as described herein. The operations of the method 1300 may be implemented by a UE or a network entity or its components as described herein. For example, the operations of the method 1300 may be performed by a UE 115 or a network entity as described with reference to FIGS. 1 through 9. In some examples, a UE or a network entity may execute a set of instructions to control the functional elements of the wireless UE or the wireless network entity to perform the described functions. Additionally, or alternatively, the wireless UE or the wireless network entity may perform aspects of the described functions using special-purpose hardware.

At 1305, the method may include receiving, from a first device, a first message indicating a power amplifier operating mode associated with non-linear distortion of an input waveform for a power amplifier of the first device, where the power amplifier operating mode is from a set of two or more power amplifier operating modes each associated with respective amounts of the non-linear distortion. The operations of 1305 may be performed in accordance with examples as disclosed herein. In some examples, aspects of the operations of 1305 may be performed by an operating mode component 725 as described with reference to FIG. 7.

At 1310, the method may include receiving, within the first message, an indication of the resource density of the additional set of reference signals. The operations of 1310 may be performed in accordance with examples as disclosed herein. In some examples, aspects of the operations of 1310 may be performed by a resource density component 760 as described with reference to FIG. 7.

At 1315, the method may include measuring a set of reference signals associated with estimation of a wireless channel for a transmission by the first device. The operations of 1315 may be performed in accordance with examples as disclosed herein. In some examples, aspects of the operations of 1315 may be performed by a reference signal component 730 as described with reference to FIG. 7.

At 1320, the method may include measuring an additional set of reference signals associated with non-linear distortion mitigation for the transmission, where a resource density of the additional set of reference signals is based on the power amplifier operating mode. The operations of 1320 may be performed in accordance with examples as disclosed herein. In some examples, aspects of the operations of 1320 may be performed by an additional reference signal component 735 as described with reference to FIG. 7.

The following provides an overview of aspects of the present disclosure:

Aspect 1: A method for wireless communication, comprising: determining a power amplifier operating mode associated with non-linear distortion of an input waveform for a power amplifier, wherein the power amplifier operating mode is from a set of two or more power amplifier operating modes each associated with respective amounts of the non-linear distortion; transmitting a set of reference signals associated with estimation of a wireless channel for a transmission; and transmitting an additional set of reference signals associated with non-linear distortion mitigation for the transmission, wherein a resource density of the additional set of reference signals is based at least in part on the power amplifier operating mode.

Aspect 2: The method of aspect 1, further comprising: transmitting a first message indicating the power amplifier operating mode, wherein transmitting the additional set of reference signals is based at least in part on transmitting the first message indicating the power amplifier operating mode.

Aspect 3: The method of aspect 2, further comprising: receiving a second message that indicates the resource density of the additional set of reference signals in response to transmitting the first message indicating the power amplifier operating mode, wherein transmitting the additional set of reference signals is based at least in part on receiving the second message that indicates the resource density.

Aspect 4: The method of aspect 2, further comprising: transmitting, within the first message, an indication of the resource density of the additional set of reference signals based at least in part on determining the power amplifier operating mode.

Aspect 5: The method of any of aspects 2 through 4, further comprising: transmitting a capability message indicating a capability to support the set of two or more power amplifier operating modes, wherein transmitting the first message that indicates the power amplifier operating mode is based at least in part on the capability.

Aspect 6: The method of any of aspects 1 through 5, wherein the power amplifier operating mode is determined based at least in part on an average power of the input waveform being above a threshold value, and the resource density of the additional set of reference signals comprises a first resource density.

Aspect 7: The method of any of aspects 1 through 5, wherein the power amplifier operating mode is determined based at least in part on an average power of the input waveform being below a threshold value, and the resource density of the additional set of reference signals comprises a second density.

Aspect 8: The method of any of aspects 1 through 5, wherein the power amplifier operating mode is determined based at least in part on a PAPR ratio of the input waveform, an MCS, an operating point associated with the power amplifier, a resource block allocation, a bandwidth associated with the transmission, or any combination thereof.

Aspect 9: The method of any of aspects 1 through 8, further comprising: multiplexing the transmission in a frequency domain for communication with a plurality of receiving devices, wherein determining the power amplifier operating mode is based at least in part on a composite time domain signal associated with the multiplexed transmission.

Aspect 10: The method of any of aspects 1 through 9, further comprising: multiplexing the additional set of reference signals in a time domain, a frequency domain, or both, based at least in part on the power amplifier operating mode.

Aspect 11: The method of any of aspects 1 through 10, further comprising: multiplexing the additional set of reference signals in a time domain, a frequency domain, or both, based at least in part on a neural network adjustment at a receiving device for the non-linear distortion mitigation.

Aspect 12: The method of any of aspects 1 through 11, further comprising: multiplexing the additional set of reference signals in a time domain, a frequency domain, or both, based at least in part on a guard period being adjacent to an occasion for transmitting a reference signal of the additional set of reference signals in the time domain.

Aspect 13: The method of any of aspects 1 through 11, further comprising: discarding a guard time associated with transmitting the additional set of reference signals based at least in part on a recurrent neural network adjustment being used at a receiving device for the non-linear distortion mitigation.

Aspect 14: The method of any of aspects 1 through 13, further comprising: receiving a third message comprising an indication of a non-linear distortion mitigation technique used at a receiving device, wherein the resource density is based at least in part on the non-linear distortion mitigation technique.

Aspect 15: A method for wireless communication at a receiving device, comprising: receiving, from a first device, a first message indicating a power amplifier operating mode associated with non-linear distortion of an input waveform for a power amplifier of the first device, wherein the power amplifier operating mode is from a set of two or more power amplifier operating modes each associated with respective amounts of the non-linear distortion; measuring a set of reference signals associated with estimation of a wireless channel for a transmission by the first device; and measuring an additional set of reference signals associated with non-linear distortion mitigation for the transmission, wherein a resource density of the additional set of reference signals is based at least in part on the power amplifier operating mode.

Aspect 16: The method of aspect 15, further comprising: receiving, within the first message, an indication of the resource density of the additional set of reference signals.

Aspect 17: The method of any of aspect 15, further comprising: transmitting, to the first device, a second message that indicates the resource density of the additional set of reference signals in response to receiving the first message indicating the power amplifier operating mode, wherein measuring the additional set of reference signals is based at least in part on transmitting the second message that indicates the resource density.

Aspect 18: The method of any of aspects 15 through 17, further comprising: receiving a capability message indicating a capability of a transmitting device to support the set of two or more power amplifier operating modes, wherein the power amplifier operating mode is based at least in part on the capability of the transmitting device.

Aspect 19: The method of any of aspects 15 through 18, wherein the power amplifier operating mode is based at least in part on an average power of the input waveform being above a threshold value, and the resource density of the additional set of reference signals comprises a first resource density.

Aspect 20: The method of any of aspects 15 through 18, wherein the power amplifier operating mode is based at least in part on an average power of the input waveform being below a threshold value, and the resource density of the additional set of reference signals comprises a second density.

Aspect 21: The method of any of aspects 15 through 18, wherein the power amplifier operating mode is based at least in part on a PAPR of the input waveform, an MCS, an operating point associated with the power amplifier, a resource block allocation, a bandwidth associated with the transmission, or any combination thereof.

Aspect 22: The method of any of aspects 15 through 21, further comprising: receiving the transmission, wherein the transmission is multiplexed in a frequency domain for communication with a plurality of receiving devices and the power amplifier operating mode is based at least in part on a composite time domain signal associated with the transmission.

Aspect 23: The method of any of aspects 15 through 22, wherein the additional set of reference signals is multiplexed in a time domain, a frequency domain, or both, based at least in part on the power amplifier operating mode.

Aspect 24: The method of any of aspects 15 through 23, wherein the additional set of reference signals is multiplexed in a time domain, a frequency domain, or both, based at least in part on a neural network adjustment being used at the receiving device for the non-linear distortion mitigation.

Aspect 25: The method of any of aspects 15 through 24, wherein the additional set of reference signals is multiplexed in a time domain, a frequency domain, or both, based at least in part on a guard period being adjacent to an occasion for transmitting a reference signal of the additional set of reference signals in a time domain.

Aspect 26: The method of any of aspects 15 through 25, further comprising: transmitting a third message comprising an indication of a non-linear distortion mitigation technique used at the receiving device, wherein the resource density is based at least in part on the non-linear distortion mitigation technique.

Aspect 27: An apparatus for wireless communication, comprising a processor; memory coupled with the processor; and instructions stored in the memory and executable by the processor to cause the apparatus to perform a method of any of aspects 1 through 14.

Aspect 28: An apparatus for wireless communication, comprising at least one means for performing a method of any of aspects 1 through 14.

Aspect 29: A non-transitory computer-readable medium storing code for wireless communication, the code comprising instructions executable by a processor to perform a method of any of aspects 1 through 14.

Aspect 30: An apparatus for wireless communication at a receiving device, comprising a processor; memory coupled with the processor; and instructions stored in the memory and executable by the processor to cause the apparatus to perform a method of any of aspects 15 through 26.

Aspect 31: An apparatus for wireless communication at a receiving device, comprising at least one means for performing a method of any of aspects 15 through 26.

Aspect 32: A non-transitory computer-readable medium storing code for wireless communication at a receiving device, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers.

Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
   a processor;
   memory coupled with the processor; and
   instructions stored in the memory and executable by the processor to cause the apparatus to:
   determine a power amplifier operating mode associated with non-linear distortion of an input waveform for a power amplifier, wherein the power amplifier operating mode is from a set of two or more power amplifier operating modes each associated with respective amounts of the non-linear distortion;
   transmit a set of reference signals associated with estimation of a wireless channel for a transmission; and
   transmit an additional set of reference signals associated with non-linear distortion mitigation for the transmission, wherein a resource density of the additional set of reference signals is based at least in part on the power amplifier operating mode.

2. The apparatus of claim 1, wherein the instructions are further executable by the processor to cause the apparatus to:
   transmit a first message indicating the power amplifier operating mode, wherein transmitting the additional set of reference signals is based at least in part on transmitting the first message indicating the power amplifier operating mode.

3. The apparatus of claim 2, wherein the instructions are further executable by the processor to cause the apparatus to:
   receive a second message that indicates the resource density of the additional set of reference signals in response to transmitting the first message indicating the power amplifier operating mode, wherein transmitting the additional set of reference signals is based at least in part on receiving the second message that indicates the resource density.

4. The apparatus of claim 2, wherein the instructions are further executable by the processor to cause the apparatus to:
   transmit, within the first message, an indication of the resource density of the additional set of reference signals based at least in part on determining the power amplifier operating mode.

5. The apparatus of claim 2, wherein the instructions are further executable by the processor to cause the apparatus to:
   transmit a capability message indicating a capability to support the set of two or more power amplifier operating modes, wherein transmitting the first message that indicates the power amplifier operating mode is based at least in part on the capability.

6. The apparatus of claim 1, wherein the power amplifier operating mode is determined based at least in part on an average power of the input waveform being above a threshold value, and the resource density of the additional set of reference signals comprises a first resource density.

7. The apparatus of claim 1, wherein the power amplifier operating mode is determined based at least in part on an average power of the input waveform being below a threshold value, and the resource density of the additional set of reference signals comprises a second density.

8. The apparatus of claim 1, wherein the power amplifier operating mode is determined based at least in part on a peak-to-average power ratio of the input waveform, a modulation and coding scheme, an operating point associated with the power amplifier, a resource block allocation, a bandwidth associated with the transmission, or any combination thereof.

9. The apparatus of claim 1, wherein the instructions are further executable by the processor to cause the apparatus to:
   multiplex the transmission in a frequency domain for communication with a plurality of receiving devices, wherein determining the power amplifier operating mode is based at least in part on a composite time domain signal associated with the multiplexed transmission.

10. The apparatus of claim 1, wherein the instructions are further executable by the processor to cause the apparatus to:

multiplex the additional set of reference signals in a time domain, a frequency domain, or both, based at least in part on the power amplifier operating mode.

11. The apparatus of claim 1, wherein the instructions are further executable by the processor to cause the apparatus to:
multiplex the additional set of reference signals in a time domain, a frequency domain, or both, based at least in part on a neural network adjustment at a receiving device for the non-linear distortion mitigation.

12. The apparatus of claim 1, wherein the instructions are further executable by the processor to cause the apparatus to:
multiplex the additional set of reference signals in a time domain, a frequency domain, or both, based at least in part on a guard period being adjacent to an occasion for transmitting a reference signal of the additional set of reference signals in the time domain.

13. The apparatus of claim 1, wherein the instructions are further executable by the processor to cause the apparatus to:
discard a guard time associated with transmitting the additional set of reference signals based at least in part on a recurrent neural network adjustment being used at a receiving device for the non-linear distortion mitigation.

14. The apparatus of claim 1, wherein the instructions are further executable by the processor to cause the apparatus to:
receive a third message comprising an indication of a non-linear distortion mitigation technique used at a receiving device, wherein the resource density is based at least in part on the non-linear distortion mitigation technique.

15. An apparatus for wireless communication at a receiving device, comprising:
a processor;
memory coupled with the processor; and
instructions stored in the memory and executable by the processor to cause the apparatus to:
receive, from a first device, a first message indicating a power amplifier operating mode associated with non-linear distortion of an input waveform for a power amplifier of the first device, wherein the power amplifier operating mode is from a set of two or more power amplifier operating modes each associated with respective amounts of the non-linear distortion;
measure a set of reference signals associated with estimation of a wireless channel for a transmission by the first device; and
measure an additional set of reference signals associated with non-linear distortion mitigation for the transmission, wherein a resource density of the additional set of reference signals is based at least in part on the power amplifier operating mode.

16. The apparatus of claim 15, wherein the instructions are further executable by the processor to cause the apparatus to:
receive, within the first message, an indication of the resource density of the additional set of reference signals.

17. The apparatus of claim 15, wherein the instructions are further executable by the processor to cause the apparatus to:
transmit, to the first device, a second message that indicates the resource density of the additional set of reference signals in response to receiving the first message indicating the power amplifier operating mode, wherein measuring the additional set of reference signals is based at least in part on transmitting the second message that indicates the resource density.

18. The apparatus of claim 15, wherein the instructions are further executable by the processor to cause the apparatus to:
receive a capability message indicating a capability of a transmitting device to support the set of two or more power amplifier operating modes, wherein the power amplifier operating mode is based at least in part on the capability of the transmitting device.

19. The apparatus of claim 15, wherein the power amplifier operating mode is based at least in part on an average power of the input waveform being above a threshold value, and the resource density of the additional set of reference signals comprises a first resource density.

20. The apparatus of claim 15, wherein the power amplifier operating mode is based at least in part on an average power of the input waveform being below a threshold value, and the resource density of the additional set of reference signals comprises a second density.

21. The apparatus of claim 15, wherein the power amplifier operating mode is based at least in part on a peak-to-average power ratio of the input waveform, a modulation and coding scheme, an operating point associated with the power amplifier, a resource block allocation, a bandwidth associated with the transmission, or any combination thereof.

22. The apparatus of claim 15, wherein the instructions are further executable by the processor to cause the apparatus to:
receive the transmission, wherein the transmission is multiplexed in a frequency domain for communication with a plurality of receiving devices and the power amplifier operating mode is based at least in part on a composite time domain signal associated with the transmission.

23. The apparatus of claim 15, wherein the additional set of reference signals is multiplexed in a time domain, a frequency domain, or both, based at least in part on the power amplifier operating mode.

24. The apparatus of claim 15, wherein the additional set of reference signals is multiplexed in a time domain, a frequency domain, or both, based at least in part on a neural network adjustment being used at the receiving device for the non-linear distortion mitigation.

25. The apparatus of claim 15, wherein the additional set of reference signals is multiplexed in a time domain, a frequency domain, or both, based at least in part on a guard period being adjacent to an occasion for transmitting a reference signal of the additional set of reference signals in a time domain.

26. The apparatus of claim 15, wherein the instructions are further executable by the processor to cause the apparatus to:
transmit a third message comprising an indication of a non-linear distortion mitigation technique used at the receiving device, wherein the resource density is based at least in part on the non-linear distortion mitigation technique.

27. A method for wireless communication, comprising:
determining a power amplifier operating mode associated with non-linear distortion of an input waveform for a power amplifier, wherein the power amplifier operating mode is from a set of two or more power amplifier operating modes each associated with respective amounts of the non-linear distortion;

transmitting a set of reference signals associated with estimation of a wireless channel for a transmission; and transmitting an additional set of reference signals associated with non-linear distortion mitigation for the transmission, wherein a resource density of the additional set of reference signals is based at least in part on the power amplifier operating mode.

28. The method of claim 27, further comprising:

transmitting a first message indicating the power amplifier operating mode, wherein transmitting the additional set of reference signals is based at least in part on transmitting the first message indicating the power amplifier operating mode.

29. A method for wireless communication at a receiving device, comprising:

receiving, from a first device, a first message indicating a power amplifier operating mode associated with non-linear distortion of an input waveform for a power amplifier of the first device, wherein the power amplifier operating mode is from a set of two or more power amplifier operating modes each associated with respective amounts of the non-linear distortion;

measuring a set of reference signals associated with estimation of a wireless channel for a transmission by the first device; and measuring an additional set of reference signals associated with non-linear distortion mitigation for the transmission, wherein a resource density of the additional set of reference signals is based at least in part on the power amplifier operating mode.

30. The method of claim 29, further comprising:

receiving, within the first message, an indication of the resource density of the additional set of reference signals.

* * * * *